(12) United States Patent
Acheff et al.

(10) Patent No.: US 8,898,681 B1
(45) Date of Patent: Nov. 25, 2014

(54) MAINFRAME VIRTUALIZATION

(71) Applicant: CA, Inc., Islandia, NY (US)

(72) Inventors: Daniel H. Acheff, Littleton, CO (US);
John J. Michelsen, Arlington, TX (US);
James Stephen Kress, Double Oak, TX (US); Steven D. LaRocca, Terre Haute, IN (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 13/775,035

(22) Filed: Feb. 22, 2013

(51) Int. Cl.
*G06F 13/00* (2006.01)
*G06F 11/26* (2006.01)

(52) U.S. Cl.
CPC ...................... *G06F 11/26* (2013.01)
USPC ........................................................ 719/317

(58) Field of Classification Search
CPC ................................................... G06F 9/4862
USPC ......................................................... 719/317
See application file for complete search history.

(56) References Cited

U.S. PATENT DOCUMENTS

| | | | |
|---|---|---|---|
| 6,122,627 A | 9/2000 | Carey et al. | |
| 6,134,540 A | 10/2000 | Carey et al. | |
| 6,879,946 B2 | 4/2005 | Rong et al. | |
| 6,957,199 B1 | 10/2005 | Fisher | |
| 6,959,441 B2 * | 10/2005 | Moore | 719/328 |
| 8,112,262 B1 | 2/2012 | Michelsen | |
| 2004/0128259 A1 | 7/2004 | Blakeley et al. | |
| 2004/0162778 A1 | 8/2004 | Kramer et al. | |
| 2005/0027648 A1 | 2/2005 | Knowles et al. | |
| 2006/0123416 A1 * | 6/2006 | Cibrario Bertolotti et al. | 718/1 |
| 2007/0089107 A1 * | 4/2007 | Squires et al. | 717/162 |
| 2008/0120129 A1 | 5/2008 | Seubert et al. | |
| 2008/0127093 A1 | 5/2008 | Fernandez-Ivern et al. | |
| 2009/0094684 A1 | 4/2009 | Chinnusamy et al. | |
| 2009/0234710 A1 | 9/2009 | Hassine et al. | |
| 2009/0298458 A1 | 12/2009 | Bakker et al. | |
| 2012/0297383 A1 * | 11/2012 | Meisner et al. | 718/1 |
| 2012/0311564 A1 * | 12/2012 | Khalid | 718/1 |
| 2013/0155083 A1 * | 6/2013 | McKenzie et al. | 345/522 |

OTHER PUBLICATIONS

Wikipedia, "Mock Object," Sep. 23, 2008, printed May 31, 2009, pp. 1-5.
Lisa, 2.0 User's Guide, Interactive TKO, Feb. 27, 2003, pp. 1-130.
Lisa, 2.0 Developer's Guide, Interactive TKO, Mar. 13, 2003, pp. 1-23.
Chapter 5—Service Discovery, Bluetooth Application Developer's Guide, 2002 (pp. 167-209).
Chaterjee, S., "Messaging Patterns in Service-Oriented Architecture, Part 1," Apr. 2004, (pp. 1-21).
U.S. Appl. No. 13/341,650, filed Dec. 30, 2011 entitled "Service Modeling and Virtualization", Inventor John J. Michelsen.

* cited by examiner

*Primary Examiner* — Andy Ho
(74) *Attorney, Agent, or Firm* — Patent Capital Group

(57) ABSTRACT

Request data is identified that describes a request of a second program by a first program intercepted by a first exit in the first program. Response data is identified that describes a response by the second program to the request as intercepted by a second exit in the first program. A virtual service configured to model operation of the second program is instantiated based on the request data and response data. In another aspect, a request by the first program to the second program is intercepted by the first exit and the request is redirected to the virtual service. A response is received as generated by the virtual service and the response is returned to the first program using the second exit.

25 Claims, 18 Drawing Sheets

| | | | SERVICE MODEL 300 |
|---|---|---|---|
| TRANSACTION 301(A) | COMMAND 311 | OBSERVED ATTRIBUTE(S) 321(1) | OBSERVED CHARACTERISTIC(S) 331(1) | OBSERVED RESPONSE 341(1) |
| TRANSACTION 301(B) | COMMAND 311 | OBSERVED ATTRIBUTE(S) 321(2) | OBSERVED CHARACTERISTIC(S) 331(2) | OBSERVED RESPONSE 341(2) |
| TRANSACTION 301(n+1) | COMMAND 311 | UNKNOWN ATTRIBUTE(S) 321(n+1) | DEFAULT CHARACTERISTIC(S) 331(n+1) | DEFAULT RESPONSE 341(n+1) |
| TRANSACTION 302(A) | COMMAND 312 | OBSERVED ATTRIBUTE(S) 322(1) | OBSERVED CHARACTERISTIC(S) 332(1) | OBSERVED RESPONSE 342(1) |
| TRANSACTION 302(B) | COMMAND 312 | USER-SPECIFIED ATTRIBUTE(S) 322(2) | USER-SPECIFIED CHARACTERISTIC(S) 332(2) | USER-SPECIFIED RESPONSE 342(2) |
| TRANSACTION 302(m+1) | COMMAND 312 | UNKNOWN ATTRIBUTE(S) 322(m+1) | DEFAULT CHARACTERISTIC(S) 332(m+1) | DEFAULT RESPONSE 342(m+1) |
| TRANSACTION 303 | UNKNOWN COMMAND 313 | UNKNOWN ATTRIBUTE(S) 323 | DEFAULT CHARACTERISTIC(S) 333 | DEFAULT RESPONSE 343 |

MAINFRAME VIRTUALIZATION

BACKGROUND

The present disclosure relates in general to the field of computer development, and more specifically, to testing involving a constrained system that may not always be available for use during testing.

Modern software systems continue to evolve and become more sophisticated, with some systems and programs designed to interoperate with, consume data or services from, or otherwise depend on other programs or applications. However, in instances whether the other programs or applications are not under the control of the entity controlling the particular program or application or otherwise constrained, such other programs and applications may not be available to the entity when testing of the particular program or application is desired. For example, an airline may be reluctant to test a new reservation application or client against the airline's live production database in order to avoid negatively impacting (e.g., in terms of database record values or database response time) actual consumer transactions that will be taking place at the same time as testing. Similarly, in order to reduce costs, a financial institution may wish to minimize interactions between a new credit card application system and a partner service due to per-transaction fees, such as those that are charged for each credit check, charged by the partner service. In yet another example, the constrained service may still be in development and thus not yet available to interact with the application under test.

BRIEF SUMMARY

According to one aspect of the present disclosure, request data can be identified that describes a request by a first program to a second program, the request data based on an interception, by a first exit in the first program, of a call to the second program by the first program. Response data can be identified that describes a response by the second program to the request, the response data based on an interception of the response by a second exit in the first program. A virtual service can be instantiated based on the request data and response data. When executed the virtual service can model operation of the second program.

In another aspect of the present disclosure, a call by a first program to a second program can be intercepted using a first exit of the first program associated with the call. The call can include a request of the second program and the request can be redirected to a virtual service configured to model operation of the second program. A response can be received to the call that was generated by the virtual service and the response can be returned to the first program using a second exit of the first program associated with the call.

BRIEF DESCRIPTION OF THE DRAWINGS

FIG. 3 is a simplified block diagram illustrating an example service model in accordance with at least one embodiment;

FIGS. 11A-11C are example screenshots for presentation in connection with an example virtualization of a program in accordance with at least some embodiments;

Like reference numbers and designations in the various drawings indicate like elements.

DETAILED DESCRIPTION

Figure 1:
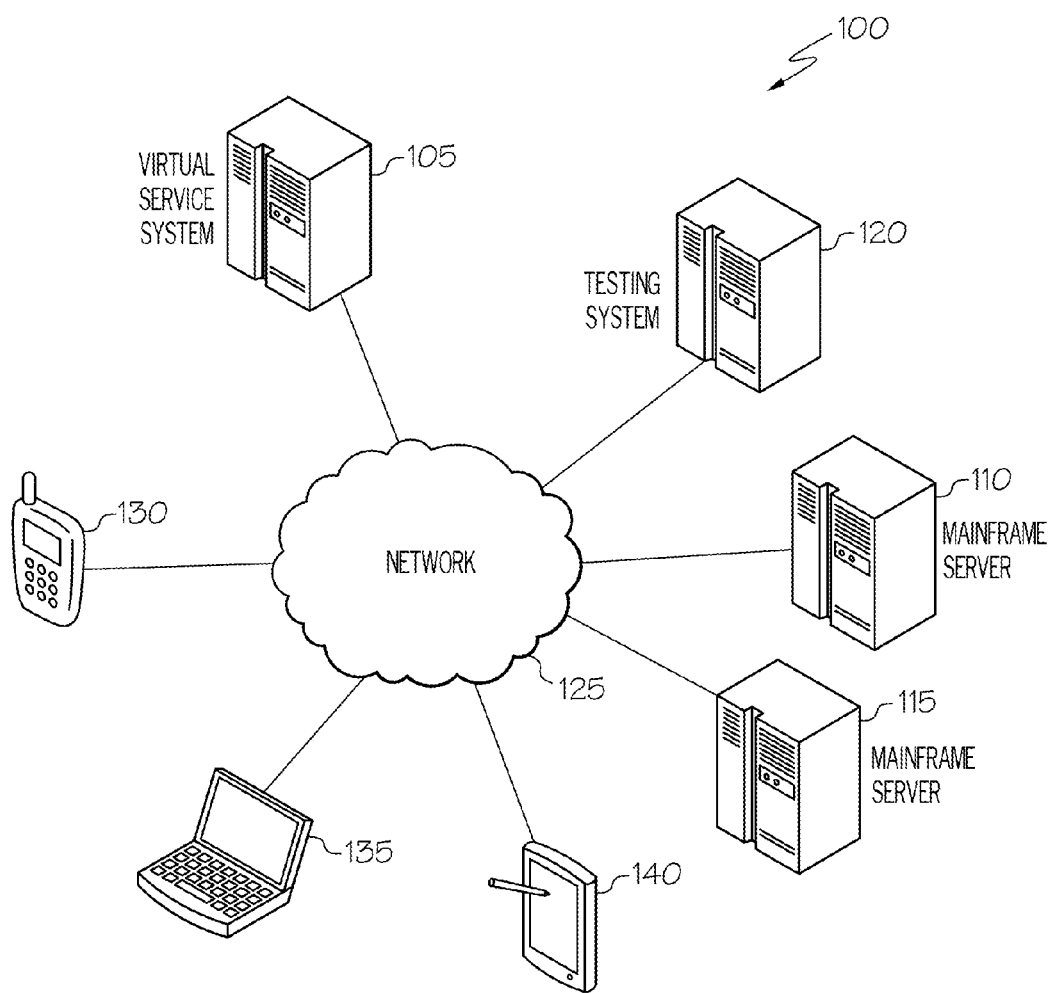
FIG. 1 is a simplified schematic diagram of an example computing system including an example virtual service system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a simplified block diagram illustrating an example computing environment 100 including a virtual service system 105 and mainframe systems 110, 115. Mainframe systems 110, 115 can include high-performance computers providing high-volume, processor-intensive computing. In some implementations, mainframe systems 110, 115 can be used within resource-intensive business and scientific processes and can execute multiple programs and large amounts of data concurrently at a high speed. In other instances, a mainframe system 110, 115 can also include lower power computing devices and be characterized by the architecture or operating system of the computing system, such as systems employing or implemented using Customer Information Control System (CICS™) middleware, the IBM™ System z platform, z/OS™, z/VSE™, UniKix™ Transaction Processing Environment, and other transaction processing environments (TPEs), among other examples. Indeed, principles of this description can be applied to other computing devices and systems not traditionally classified as a mainframes per se, such as computing devices utilizing operating platforms and programs that apply features of architectures, platforms, and operating systems utilized in more traditional mainframes or including features similar to those described below. Indeed, use of the term "mainframe" within this disclosure should be understood to cover or apply to such systems.

Further, mainframe systems 110, 115 (and other computing devices) can include or host one or more software components, such as various programs, scripts, objects, applications, modules, among other software. In some implementations, software components of mainframe systems 110, 115 may be designed so as to function collaboratively with or be otherwise dependent on other software components, even software components hosted on other, remote computing devices, including other mainframe systems, web servers, and other sources over one or more networks 125. Such other software components can be implemented, in some cases, using different architectures, operating systems, and software platforms and can be, in some instances, controlled or owned by other entities.

Virtual service system 105 can be used to generate and run virtual services modeling software components, including software components of mainframe systems 110, 115. Such virtual services can simulate operation of and act as stand-ins for one or more software components within a test, development, educational, training, or other environment, such as test environment provided using testing system 120.

In some implementations, a virtual service can model software components not readily available for use with another software component upon which the other software component depends or with which the other software component is to interact. For instance, the use of a particular software component modeled by a corresponding virtual service may be desirable in connection with testing or development of the other software component. Where the particular software component is constrained in that it is not available (e.g., offline, under maintenance, under development, etc.) or when it would otherwise not be desirable to utilize the actual particular software component, a corresponding virtual service can possess functionality allowing the virtual service to effectively stand in for the particular software component. For instance, such virtual services can be configured to generate value- and state-aware responses to requests received from a real world software component (such as a software component hosted by another mainframe system (e.g., 110, 115)), as well as model the performance characteristics of the modeled software component, among other examples.

Further, in some instances, applications (and other software components), including software components of mainframe systems 110, 115, can additionally function to provide graphical user interfaces for users to interface with the application using one or more user computing devices (e.g., 130, 135, 140). Further, user computing devices (e.g., 130, 135, 140) can also be used to interface with virtual service system 105, for instance, to coordinate, edit, and provide further inputs in connection with the generation and maintenance of virtual service models simulating operation of one or more software components. For instance, users can edit the models, change assumptions or data relied upon by the models, among other examples. Additionally, user computing devices 130, 135, 140 can be used to select particular software components to be virtualized using virtual services generated by virtual service system 105 as well as select generated virtual services for deployment in one or more environments, including testing environments hosted by testing system 120, among other examples.

In general, "servers," "clients," "computing devices," "mainframes," "network elements," "hosts," "system-type system entities," "user devices," and "systems," etc. (e.g., 105, 110, 115, 120, 130, 135, 140, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including z/OS, z/VSE, Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 130, 135, 140, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a virtual service system 105, testing system 120, or other sub-system of computing environment 100 (such as an environment in which models are to be instantiated and run) can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

In some instances, a first software component can be dependent on another software component or system of software components. When the other software components are unavailable or otherwise constrained, use of the first software component can be impeded. For instance, if operation of the first software component in a test, a training environment, or development environment is to rely at least in part on the first software components interactions and interoperation with the other software component, the test, training session, etc. can be jeopardized by the unavailability of the other software component. In traditional systems, stubs or piecemeal responders could be manually developed by a team in an attempt to partially model responses of the unavailable software component. The development of such models, however, can be a time-intensive and expensive process as the entity conducting the testing, training, development, etc. is forced to divert valuable resources to the development of a stand-in component. Further, traditional stubs or responders are limited in their functionality in that they typically provide "dumb" or canned responses to requests, among other limitations. Additionally, in one example, services implemented in a CICS transaction server or mainframe can be difficult to simulate. Services implemented in CICS can span multiple CICS regions. Automating the generation of a model of the services and software components within a CICS or other mainframe environment can be particularly difficult, among other issues.

Figure 2:
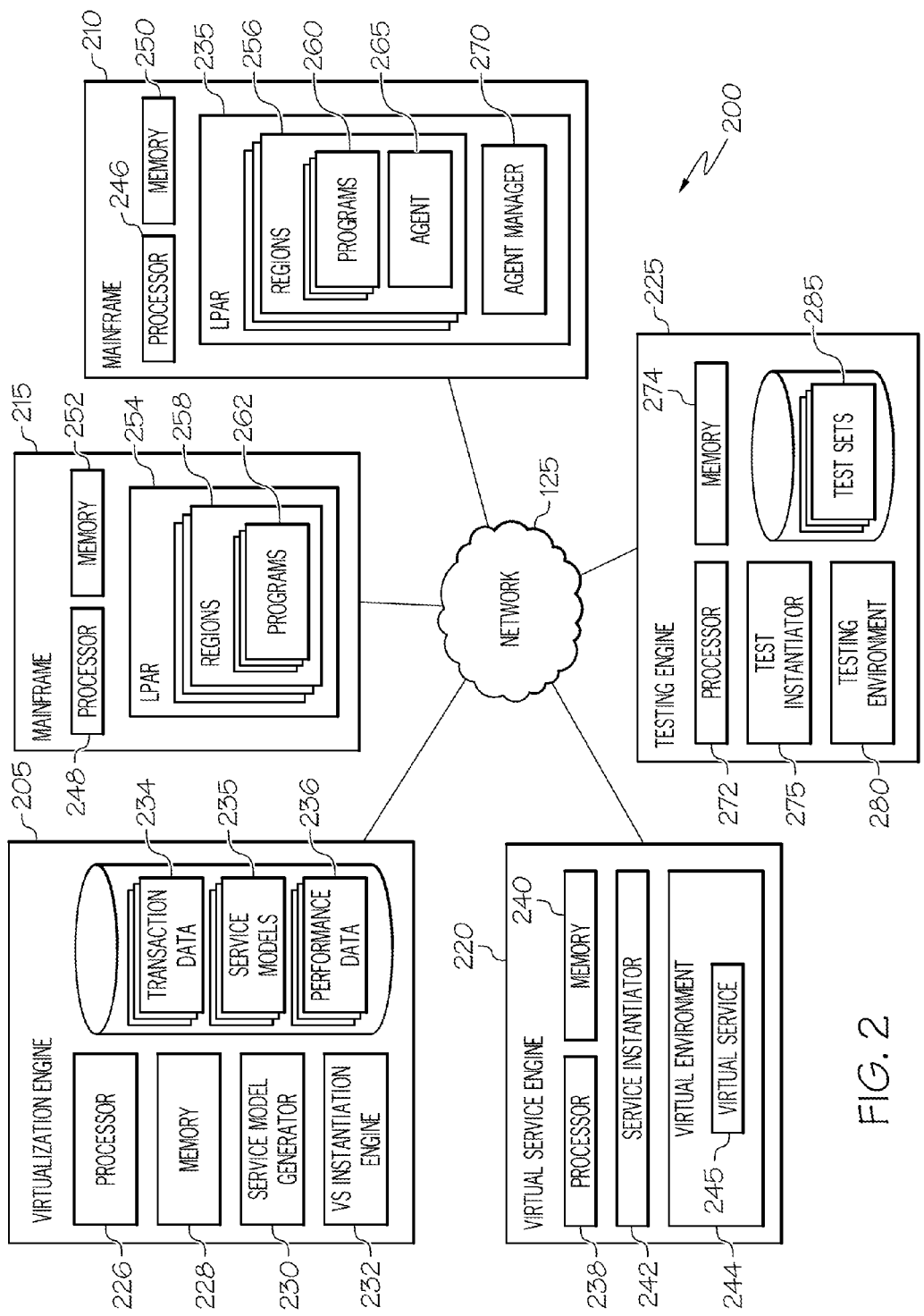
FIG. 2 is a simplified block diagram of an example computing system including an example virtualization engine in accordance with at least one embodiment.

At least some of the systems described in the present disclosure, such as the systems of FIGS. 1 and 2, can at least partially address at least some of the above-discussed issues, as well as others not explicitly described. For instance, turning to the example of FIG. 2, a simplified block diagram 200 is shown illustrating an example environment including a virtualization engine 205 adapted to generate service models that can be deployed as virtual services modeling one or more software components (e.g., programs 260, 262 hosted by mainframes 210, 215, etc.). A virtual service engine 220 can also be provided through which the virtual services (e.g., 245) can be instantiated. Such virtual services can be used, for instance, in a test, facilitated using a testing engine 225, among other examples.

An example virtualization engine 205 can include, in some implementations, one or more processor devices (e.g., 226), one or more memory devices (e.g., 228), and other hardware and software components including, for instance, service model generator 230, a virtual service instantiation engine 232, among other example components, including components exhibiting other functionality or components combining functionality of two or more of the above components, among other examples. A virtualization engine 205 can be used to generate and manage virtual services. Service models 235 can be generated, in some implementations, for processing by a virtual service engine 220 (using, for instance, a service instantiator 242) to construct a virtual service (e.g., 245) from service models (e.g., 235) generated by virtualization engine 205. The virtual service 245 can be executed and hosted within a virtual service environment 244, such as a virtual service environment implemented using one or more virtual machines or another environment. A virtual service engine 220 can include one or more processor devices 238 and memory elements 240 among other software and hardware components. In some implementations, functionality of virtual service engine 220 can be combined with or included in functionality of the virtualization engine 205. For instance, in some implementations, virtualization engine 205 can both construct service models 235 as well as instantiate virtual services (e.g., 245) from those service models 235, among other potential implementations that may be used in the generation of virtual services.

In one example, service models 235 can be generated by virtualization engine 205 (e.g., using service model generator 230) based on detected requests and responses exchanged between two or more software components or systems (such as programs 260 and 262). Such request and response information can be captured, for instance, using agents (e.g., 265) deployed, for instance, in a region (e.g., 252) of a mainframe (e.g., 210), among other examples. Data describing such requests and responses, as well as characteristics of the requests and responses, can be embodied, for example, in transaction data 234. In some implementations, service model generator 230 can build service models 235 from transaction data 234.

In one particular example, a service model generator 245 can generate and store information in service models 235 identifying one or more characteristics of the transactions described in transaction data 234. Such information can include performance information describing performance characteristics of the transactions and the programs to be modeled, such as timing information identifying times at which particular requests and/or responses are detected or sent (e.g., in order to identify the delay between when the request was detected and/or sent and when the associated response was detected and/or sent), information identifying current bandwidth usage of a network on which the traffic is being conveyed, information identifying current processor and/or memory usage on one or both of the computing devices implementing a corresponding requester software component and server software component, and the like. Virtual services instantiated from such service models can embody the performance characteristics captured or defined in the service model, including response times, network bandwidth characteristics, processor usage, etc.

In one example, a service model generator 230 can be configured to identify requests and responses, from transaction data 234, in each of a variety of different protocols and to extract and record the pertinent information from each. Thus, service model generator 230 can include configuration information identifying the basic structure of requests and responses for each of several supported communication protocols. When generating service models 235, service model generator 230 can access the appropriate configuration information in order to process the observed traffic. Depending upon the protocol in use, for instance, requests can take the form of method calls to an object, queue and topic-type messages (e.g., such as those used in Java messaging service (JMS)), requests to access one or more web pages or web services, database queries (e.g., to a structured query language (SQL) or Java database connectivity (JDBC) application programming interface (API)), packets or other communications being sent to a network socket, and the like. Similarly, responses can include values generated by invoking a method of an object, responsive messages, web pages, data, state values (e.g., true or false), and the like.

Transaction data 234 can be collected from one or more monitoring tools (e.g., agents 265, agent managers 270, etc.) configured to gather data from logic, such as CICS or other exits, logically inserted within a communication pathway between a transacting client (or requester) software component and a server (or responding) software component. Transaction data 234 can also be obtained through other monitoring techniques, including the monitoring of appropriate queue(s) and topics for new messages being exchanged between a requester component and responding component communicating via messaging, intercepting method calls to a particular server component (e.g., object), and so on. Further, monitoring tools can also intercept responses from the responding software component and corresponding information in transaction data 234 can be generated that identifies those responses as corresponding to requests of a particular requester component, among other examples. Indeed, in some implementations, transaction data can be generated from an image captured by an agent (e.g., 265) that identifies a request-response pair, among other examples.

Transaction data 234 can further document attributes of requests and responses detected within a particular transaction. For example, a request can include an operation and one or more attributes. As an example, transaction data can identify a command to perform a login operation as well as attributes that include the user name and password to be used in the login operation. Accordingly, service model generator 230 can also parse requests identified in transaction data 234 in order to identify whether any attributes are present and, if so, to extract and store information identifying those attributes. Thus, information identifying a request in a corresponding service model (e.g., 235) can include information identifying a command as well as information identifying any attributes present within the request. Similarly, for responses, a service model generator 230 can parse transaction data to identify responses and response attributes (e.g., using protocol-specific configuration information in order to determine how to locate the attributes within the response) and incorporate such information in service models identifying the response.

Service models 235 can be used as the basis of virtual services modeling the software components providing the requests and/or responses modeled in the service models 235. Virtual services can capture and simulate the behavior, data and performance characteristics of complete composite application environments, making them available for development and testing at the request of a user or system and throughout the software lifecycle, among other advantages. In some instances, a virtualization engine 205 can include functionality for the creation of complete software-based environments using virtual services that simulate observed behaviors, stateful transactions and performance scenarios implemented by one or more software components or applications. Such virtual services provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment 244 implemented, for instance, within on-premise computing environments, in private and public cloud-based lab, using virtual machines, traditional operating systems, and other environments, among other examples. In some implementations, virtualization system 205 and virtual services (e.g., 245) and other supporting components can utilize or adopt principles described, for example, in U.S. patent application Ser. No. 13/341,650 entitled "Service Modeling and Virtualization," incorporated herein by reference in its entirety as if completely and fully set forth herein.

In some implementations, when a service model is used to instantiate a virtual service, the virtualization process can involve comparing new requests generated by a requester (e.g., a client application under test or development) to the request information stored in a corresponding service model. For example, if a new request containing a particular command and attribute is received, the service model can be searched for a matching request that contains the same command and attribute. If a matching request is found, the virtualization process returns the response (as identified by information stored in service model) associated with the matching request to the requester.

In many situations, the requests provided to a virtual service will not be exactly the same (i.e., containing the same request as well as the same attribute(s)) as the requests identified in service model. For example, a request provided to the corresponding virtual service may contain the same request but a different attribute or set of attributes. A service model can further include information usable to handle these requests. For instance, transactions containing requests that specify the same command can be identified as being of the same transaction type. Alternatively, a set of transactions can be identified as being of the same type if all of those transactions have requests that include the same command as well as the same number and type of attributes. The particular technique used to identify whether two or more transactions are of the same type can be protocol specific, in some embodiments (e.g., classification of transactions can be at least partially dependent upon the particular communication protocol being used between the requester and the server).

For each unique type of transaction included in a service model, some implementations of a service model can further provide information or instructions for use by a virtual service in generating responses to requests with unknown attributes (e.g., an unknown attribute that was not observed as part of the monitored traffic or even specified by a user during a manual service model building process). Further, service models can also include information describing how to respond to an unknown request (e.g., a request that contains a command that was not observed as part of the monitored traffic). As an example, the request portion of this service model information can indicate (e.g., through the use of a wildcard command identifier) that all unknown types of requests that are not otherwise identified in service model should match this request. The response portion of the generated information can include an appropriate response, among other examples.

In addition to adding information describing unknown transactions of known and unknown types, some implementations of service models can support time sensitive responses. In such embodiments, response information in the server model can facilitate substitution of time sensitive attributes for actual observed attributes. For instance, an actual attribute "10:59 PM Oct. 1, 2009" can be replaced with a time sensitive value such as "[SYSTEM CLOCK+11 HOURS]". When the service model is used to generate responses by the virtual service, the time sensitive value can be used to calculate the appropriate attribute to include in each response (e.g., based on the current system clock value). To illustrate, in this particular example, if the service model is being used by a virtual service and the response attribute includes the time sensitive value [SYSTEM CLOCK+11 HOURS], the response generated based upon the service model will include the value generated by adding 11 hours to the system clock value at the time the request was received. In general, time sensitive values specify an observable time, such as a time value included in a request or the current system clock time, and a delta, such as an amount of time to add or subtract from the specified observable time. Time sensitive values can be included in the response information for all types (known and unknown) of transactions.

In some implementations, a service model can further include information facilitating the use of request sensitive values to be included in responses generated by the virtual service using the service model. A request sensitive value can link an attribute included in the request to a value to be included in the response. For example, response information in a service model can indicate that a particular request attribute be used as the basis of a particular attribute of the response to be returned in response to the request.

When the model is used, the response generated by the virtualized service will include the value indicated by the request sensitive value. For example, the model can include three known transactions of a given transaction type, as well as one unknown transaction of that type. The information describing the unknown transaction can indicate that the single response attribute is a request sensitive attribute that should be the same as the first attribute of the request. A request of that type that contains an unknown first attribute (i.e., an attribute that does not match the attribute(s) stored for the three known transactions of that type in the model) can be sent to the virtualized service. In response to receiving this request and accessing the request sensitive value specified in the response information for the unknown transaction, the virtualized service returns a response that includes the value of the first attribute that was contained in the received response. As an example, if the information describing a known transaction of type A indicates that the request includes the string "UserID" as the first request attribute and that the corresponding response includes the string "UserID" as its second response attribute, a request sensitive value specifying "[REQUEST ATT 1]" (first request attribute) can be generated for the second response attribute in the service model, among many other potential examples, including more complex examples with more complex dependencies defined in the service model between certain request attribute and request sensitive response attributes.

A service model can include still additional information. For example, a service model can identify characteristics of each transaction in order to identify availability windows for a corresponding software component modeled by the service model, load patterns for the software component, and the like. For example, if an access window is identified for a particular type of transaction, a corresponding service model can be generated to include a characteristic indicating that a response (or a particular type of response) will only be generated if the request is received during the identified access window, among many other potential examples.

Turning briefly to FIG. 3, a simplified block diagram is shown representing an example view of an example service model 300. For instance, FIG. 3 shows information that can be maintained as part of a service model. In this particular example, service model 300 can include a row for each of several transactions. Each row of service model 300 can identify a command, zero or more attributes, zero or more characteristics, and one or more response attributes. This service model can be stored in a spreadsheet, table, database, or any other data structure.

In this example, transaction 301(A) can be a transaction that was an observed transaction that actually occurred between a requester and a server component being modeled, as detected, for instance, by an agent or other tool. The information describing transaction 301(A) can include request information, which includes command 311 and zero or more defined attributes 321(1). The information describing transaction 301(A) can also include response information 341(1) describing the expected response that corresponds to the request. This response information 341(1) can also include one or more attributes. Characteristics 331(1) can include zero of more characteristics of transaction 301(A) observed during monitoring of the transaction. These characteristics can include timing information describing a threshold delay of a response to a request or the like, as described above.

Transaction 301(B) can be of the same transaction type as transaction 301(A), since both transactions included a request that contained command 311. Transaction 301(B) is described by attributes 321(2) (which can have values that differ from those attributes defined in the request of transaction 301(A)), characteristics 331(2) (which can again differ from those for transaction 301(A)), and response 341(2) (which can also have a value that differs from the response defined for transaction 301(A)).

In this example, information describing n (an integer number) known transactions of the same type as transactions 301(A) and 301(B) can be stored in service model 300. As part of the model building process, information describing an n+1th transaction of the same type has been added to service model 300 by the service model generator. This n+1th transaction, labeled transaction 301($n$+1), can describe an "unknown" transaction of a known type of transaction. Such an unknown transactions is of a known type because it has the same command, command 311, as the other transactions of this type. However, unlike the other known transactions of this type, unknown transaction 301($n$+1) can be used to respond to requests containing command 311 and "unknown" attributes that do not match those known attributes stored for transactions 301(A)-201($n$) (not shown). The information describing transaction 301($n$+1) thus includes information (e.g., wildcard information) identifying unknown attributes 321($n$+1), such that any request that includes command 311 and an attribute that does not match the defined attributes stored for the actual transactions (e.g., such as transactions 301(A) and 301(B)) will match the request information for transaction 301($n$+1). The information describing transaction 321($n$+1) can also include default characteristics 331($n$+1) and default response 341($n$+1). These default values can be copied from the corresponding fields of an actual response of the same type.

Information describing another set of transactions of a different type can also be stored within the service model 300 for a particular software component. As shown, m+1 transactions, including transaction 302(A), 302(B), and 302($m$+1) of a type of transaction in which the request includes command 312 can be stored in service model 300. Like transactions 301(A) and 301(B), transaction 302(A) can be another transaction observed through monitoring of a particular software component or set of transactions involving the particular software component. Further, the information describing this transaction can also include the corresponding command 312, attributes 322(1) (if any), defined characteristics 332(1) (if any), and corresponding response 342(1).

In some instances, a model generator can automatically generate a set of requests and responses, together with corresponding attributes and characteristics of the requests and responses based on transaction data provided to the model generator. In some implementations, a user can supplement the transaction defined by the model generator with one or more user-specified transactions, for instance, to capture a nuance not adequately detected and captured by the model generator, among other examples. For instance, a user can enter the information describing such a transaction via a user interface. The information describing transaction 302(B) can include command 312, zero or more user-specified attributes 322(2), zero or more user-specified characteristics 332(2), and a user-specified response 342(2). In some embodiments, the user is prompted for entirely new information for each of these user-specified fields. In other embodiments, the user can be allowed to select an existing field (e.g., of another user-specified transaction or of an automatically-detected transaction) to copy into one or more of these fields. It is noted that a user can also create a user-specified transaction by modifying information describing an actual transaction. As FIG. 3 shows, user-supplied transaction information can be stored in the same model as transaction information generated from parsing of image or transaction data received, for instance, from monitoring of programs and transaction in a mainframe system.

In some instances, a service model 300 can also include information describing an unknown transaction 302($m$+1). The information describing transaction 302($m$+1) was added to service model 300 after m (an integer number, which does not necessarily have the same value as n) known transactions were described by the model. The information describing this unknown transaction 302($m$+1) can be used to handle requests of the same type (e.g., containing command 312) that specify unknown attributes. Accordingly, the information describing transaction 302($m$+1) can include command 312, unknown attributes 322($m$+1) (i.e., attribute information that will match any attributes not identified in the known attributes stored for the other m transactions of this type), default characteristics 332($m$+1), and default response 342($m$+1). Further, transactions of an unknown transaction of unknown type (e.g., 303) can also be defined in a service model 300. For instance, the information describing transaction 303 can be used to respond to any request of a type not already described by another row of service model 300. Accordingly, a request containing a command other than commands 311 and 312 could be responded to using the information describing transaction 303, among other examples. As shown, the information describing transaction 303 includes unknown command information 313, which is configured to match any command not already specified in service model 300, unknown attribute information 323, which is configured to match all attributes (if any) associated with unknown commands, default characteristics 333, and a default response 343. As with the default characteristics and responses associated with unknown transactions of known type, transaction 303's default characteristics and response can be user-specified.

Figure 4:
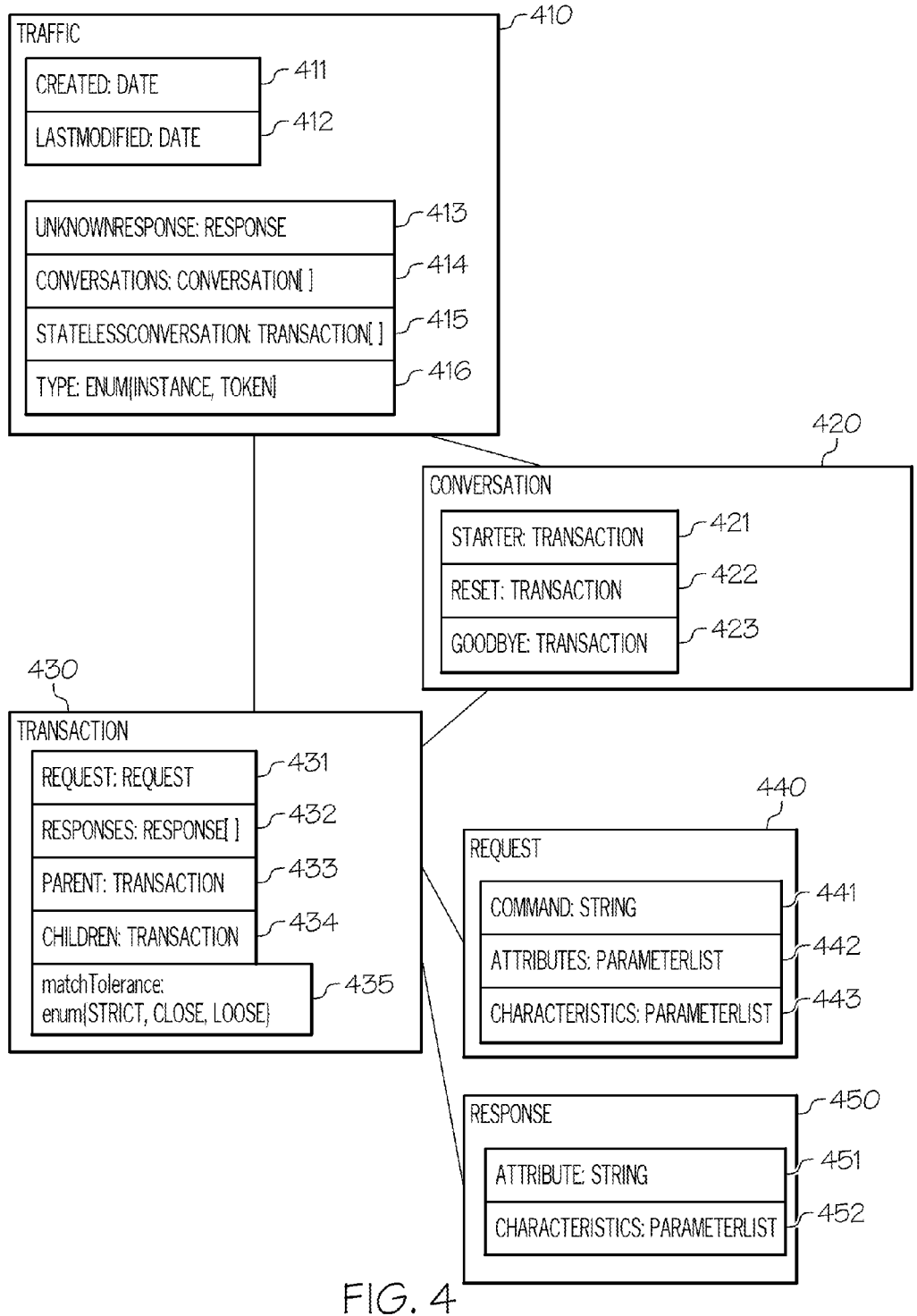
FIG. 4 is a simplified block diagram illustrating aspect of another example service model in accordance with at least one embodiment.

Turning now to FIG. 4, a simplified block diagram is shown illustrating representing example features of an example service model for use in virtual services supporting stateful and stateless transactions. Statefulness of a transaction can be identified from parsing of observed transaction data to generate a service model supporting the modeling of such stateful transactions. In the example of FIG. 4, a data model is shown that includes five data patterns: traffic pattern 410, conversation pattern 420, transaction pattern 430, request pattern 440, and response pattern 450. Each service model can include a single instance of traffic pattern 410. As shown, traffic pattern 410 includes created field 411, which stores date information identifying when the service model of that particular application was initially created. Traffic pattern 410 also includes lastModified field 412, which stores date information identifying the most recent time at which any of the information in the service model of the particular service was modified.

Traffic pattern 410 can also include an unknownResponse field 413. UnknownResponse field 413 can store information identifying the particular instance of the response pattern that stores information identifying the response to use for unknown transactions of unknown types. Accordingly, in embodiments employing the data pattern of FIG. 4, if an unknown transaction of unknown type is detected by a request processing module, the request processing module will use the response pattern instance identified in unknownResponse field 413 to generate a response.

Traffic pattern 410 includes conversations field 414. Conversations field 414 can identify one or more instances of conversation pattern 420. Conversation pattern 420 stores information representing a set of two or more stateful transactions. Such a set of stateful transactions is referred to herein as a conversation. The instance(s) of conversation pattern 420 identified in conversations field 414 identify all of the conversations for the application to be modeled. If the particular service does not include any stateful transactions (e.g., if no stateful transactions are identified from transaction data describing the observed transactions), conversations field 414 will not identify any instances of conversation pattern 420.

Traffic pattern 410 can additionally include statelessConversation field 415. This field can identify one or more instances of transaction pattern 430. Transaction pattern 430 stores information representing a transaction. Each instance of transaction pattern 430 identified in statelessConversation field 415 stores information identifying a stateless transaction. StatelessConversation field 415 can identify instances of transaction pattern 430 associated with both known and unknown transactions of known types. If the particular service being modeled does not include any stateless transactions, statelessConversation field 415 will not identify any instances of transaction pattern 430. Type field 416 can store one of two values: INSTANCE or TOKEN that identifies the type of stateful transactions, if any, provided by the service being modeled.

As noted above, conversation pattern 420 can store information identifying a set of stateful transactions. A given service model can include n instances of conversation pattern 420, where n is an integer that is greater than or equal to zero. Conversation pattern 420 can include a starter field 421. This field stores information identifying an instance of transaction pattern 430 associated with a starter transaction. The starter transaction is a transaction that acts as the first transaction in a stateful series of transactions (e.g., a login transaction). In at least some embodiments, all starter transactions can be unknown transactions of known type, as will be described in more detail below. The particular transaction type to use as a starter transaction can be specified by the model generator or a user during the service model configuration process.

Conversation pattern 420 also includes reset field 422. Reset field 422 stores information identifying one or more instances of transaction pattern 430, each of which is associated with a reset transaction (such a reset transaction can be a known or unknown transaction). The value of reset field 422 can be provided by a user (e.g., the user can be prompted to identify the reset transaction(s) for each conversation). A reset transaction is a transaction that, if detected, causes the flow of the conversation to return to the point just after performance of the starter transaction. Conversation pattern 420 also includes a goodbye field 423. This field stores information identifying an instance of transaction pattern 430 associated with one or more goodbye transactions (of known or unknown type) for the conversation. A goodbye transaction is a transaction that causes the conversation to end. To reenter the conversation after a goodbye transaction is performed, the starter transaction for that conversation would need to be re-performed.

Transaction pattern 430 stores information identifying a transaction. Transaction pattern 430 includes request field 431, responses field 432, parent field 433, children field 434, and matchTolerance field 435. Transaction pattern 430 can be used to store stateful and stateless transactions (in some instances, the same transaction can occur both within a conversation and in a stateless situation where no conversation is currently ongoing). Transactions that are always stateless will not include values of parent field 433, children field 434, or matchTolerance field 435.

Request field 431 identifies the instance of request pattern 440 that stores information identifying the request (e.g., by command and attributes) portion of the transaction. Similarly, responses field 432 identifies one or more instances of response pattern 450 that store information identifying the response(s) that are part of that transaction. Each instance of response pattern 450 stores one response attribute (e.g., like those shown in FIG. 2), and thus if responses field 432 identifies multiple response patterns, it indicates that each of the identified response patterns should be used to generate a response when the corresponding request is received.

Parent field 433 stores a value identifying the instance of transaction pattern 430 associated with the transaction that occurs immediately before the current transaction in a conversation. Thus, if transaction pattern 430 stores information identifying the second transaction in a conversation (where the starter transaction is the first transaction in the conversation), parent field 433 can identify the instance of transaction pattern 430 associated with the starter transaction. Similarly, children field 434 can store information identifying each instance of transaction pattern 430 associated with a child transaction of the current transaction. Thus, if transaction pattern 430 stores information identifying the second transaction in a conversation, children field 434 can store information identifying the instance of transaction pattern 430 that stores the third transaction in the conversation. It is noted that children field 434 can identify more than one transaction.

MatchTolerance field 435 can store one of three values: STRICT, CLOSE, or LOOSE. The stored value indicates the match tolerance for a request received immediately subsequent to the current transaction. Strict tolerance indicates, for instance, that, if a conversation is ongoing, the request received immediately after the current transaction is only allowed to match transactions identified in the current transaction's children field 434. If instead close tolerance is specified, the request received immediately after the current transaction can match any of the current transaction's children, as well as any of the current transaction's sibling transactions. Further, if loose tolerance is specified, even more transactions are candidates for matching the next received request, and so on.

Request pattern 440 can include a command field 441, attributes field 442, and characteristics field 443. Each instance of request pattern 440 stores information identifying a particular request. A service model generator can allocate an instance of request pattern 440 for each transaction of known or unknown type. Command field 441 can store a string that identifies the command contained in the request. Attributes field 442 can store a parameter list that includes zero or more parameters, each of which represents an attribute of the request. Characteristics field 443 can store a parameter list identifying zero or more characteristics associated with the request. Each parameter in the list can identify a different characteristic. Examples of characteristics can include the time at which the request was sent, the system clock time at which the request was received by the service being modeled, network and/or system conditions that were present when the request was received, and the like. The parameters stored in characteristics field 443 can be used to generate time sensitive values, as well as to model actual conditions such as response timing and availability window, among other examples.

Response pattern 450 can include an attribute field 451 and a characteristics field 452. Attribute field 451 stores a string that represents a response attribute. As noted above, a given transaction can have multiple response attributes (e.g., responses field 432 of transaction pattern 430 can identify multiple instances of response pattern 450), and thus generating a response can involve accessing multiple response patterns in order to include the string identified in each of the response patterns' attribute field 451 in the response. Attribute field 451 can store a response attribute, as well as values, like request sensitive values and time sensitive values, generated by the service model generator. Characteristics field 452 can store a parameter list containing zero or more parameters. Each parameter can identify a characteristic of the response, such as the system clock time when the response was sent to the requester by the service, network and/or system conditions that were present when the response is to be sent, and the like.

Returning to the discussion of FIG. 2, example computing environment 200 can include one or more computing devices, such as mainframes 210, 215 hosting one or more programs 260, 262 that can be virtualized through the monitoring of requests and responses (transactions) involving the respective program using one or more agents (e.g., 265). A mainframe 210, 215 can include one or more processor devices 246, 248 and one or more memory elements (e.g., 250, 252). A mainframe, in one example, can include one or more logical partitions (LPARs) (e.g., 253, 254) that logically divide processor, memory, and storage resources that can be utilized independently with its own operating system instances and programs. Further, one or more regions (e.g., 256, 258) can be included within a mainframe 210, 215. A region (e.g., 25, 258) can be a collection of mainframe resources controlled as a unit and used within the system to perform one or more tasks. Such resources can include, for example, programs (e.g., 260, 262), Basic Mapping Support (BM) map sets, transactions, terminals, files, transient data queues, temporary storage queues, among other examples.

In some implementations, mainframe programs (e.g., 260, 262) can include one or more commands and one or more user exits (or "exits"). Such exits can be a point within a program at which control can be transferred to another program (e.g., in connection with a call or other command). An exit can also be used to return control when the other program has finished its work. For instance, in the particular example of CICS, a LINK command can be used to invoke a call of one program to another program including programs on other CICS regions, other LPARs, or other mainframe machine. In one example, the LINK command can be preceded and followed by respective exits, such as the CICS XPCREQ exit and CICS XPCREQC exit.

In one implementation, specialized exits can be defined and installed onto a program to be monitored and virtualized. The specialized exits can monitor characteristics of a call being made to another program (e.g., through a CICS LINK command) as well as the response to the call. The exits, or other logic, can observe and record transaction information describing the nature of the request(s) and response(s) passing through the exits. Further, exits can provide such transaction information to one or more agents (e.g., 265). An agent manager (e.g., 270) can collect such transaction information from the agents on a particular LPAR 235 or mainframe device 210 and communicate this information to virtualization engine 205 as transaction data (e.g., 234) for use by the virtualization engine 205 in generating a service model 235 and virtual service 245 to model one or more of the mainframe programs involved in the observed transactions, among other examples.

In some example implementations, a testing engine 225 can be used in connection with the execution of a virtual service (e.g., 245). An example testing engine 225 can include, for example, one or more processor devices (e.g., 272) and one or more memory elements (e.g., 274) for use in executing one or more components, tools, or modules, or engines, such as a test instantiator 275 and testing environment 280, among other potential tools and components including combinations or further compartmentalization of the foregoing. Test instantiator 275 can be used to load one or more predefined test sets 285 that include, for instance, data for use in causing a particular software component under test to send a set of requests to a server software component. In some instances, the server software component (or server system hosting the server software component) can be replaced by one or more virtual services provided through virtualization engine 205. Test sets 285 can include additional instructions and data to cause the one or more virtual services to be automatically instantiated (e.g., using virtual service instantiation engine 232 and/or virtual service engine 220, etc.) for use in the test. Further, test sets 285 can also identify particular conditions to be applied in the tests of the particular software component, including the identification of particular performance characteristics to be used to model particular conditions within the test, among other examples.

Figure 5:
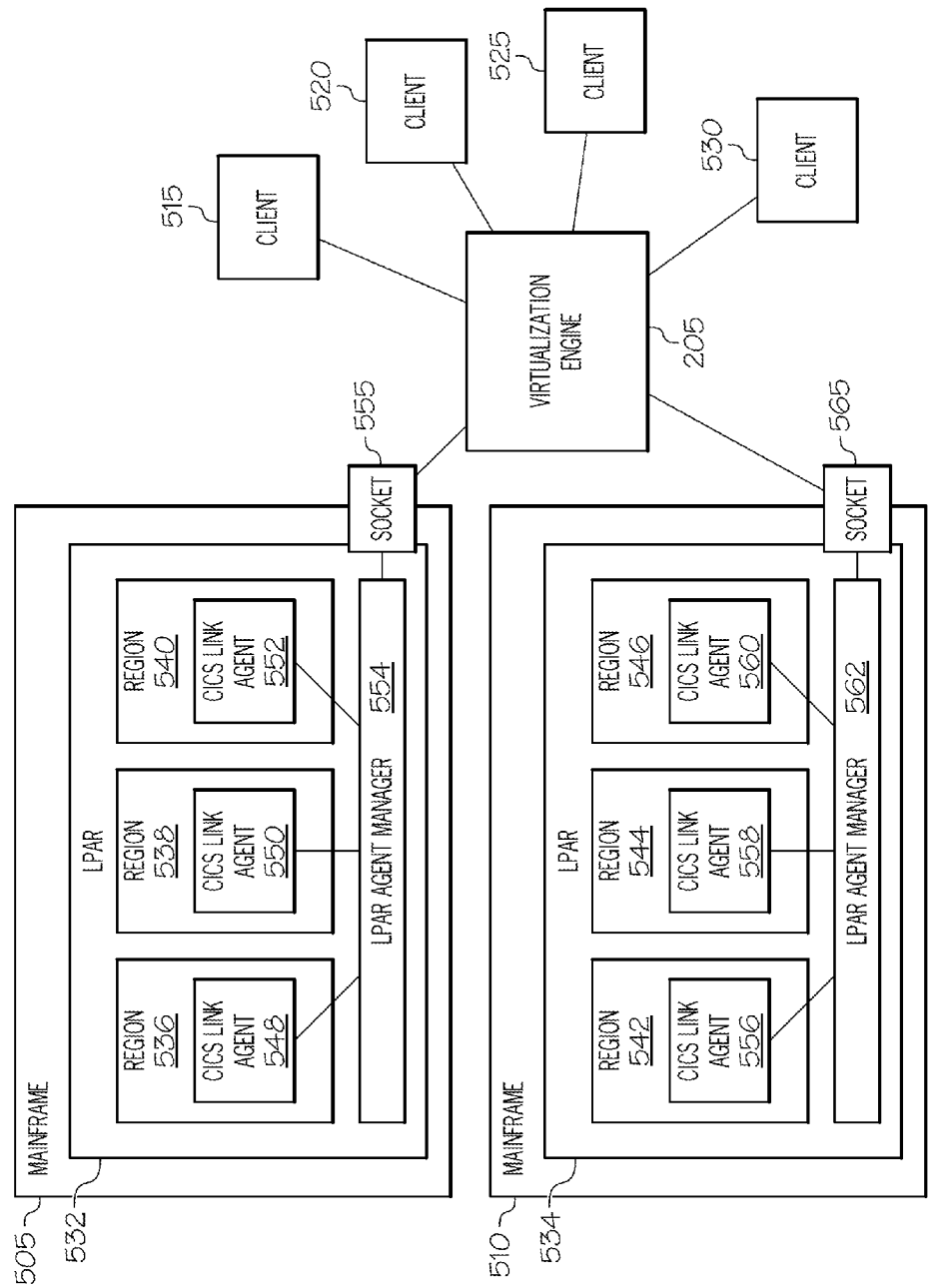
FIG. 5 is a simplified block diagram illustrating an example architecture of mainframes adapted to communicate with an example virtualization engine in accordance with at least one embodiment.

Turning to FIG. 5, a simplified block diagram is shown illustrating an example of a virtualization engine 205 in connection with one or more CICS mainframes 505, 510 and one or more clients 515, 520, 525, 530. In the particular example of FIG. 5, each mainframe 505, 510 can include one or more LPARs 532, 534. Each LPAR can have one or more regions (e.g., 536, 538, 540, 542, 544, 546). Programs and other software components can be implemented in the regions 536, 538, 540, 542, 544, 546. Further, each region 536, 538, 540, 542, 544, 546 can be provided with an agent (e.g., 265) such as CICS LINK agents 548, 550, 552, 556, 558, 560 that can function in connection with exits or other logic employed in connection with a CICS LINK command to intercept or record request and response information as well as other transaction information relating to a call from one program to another using the LINK command. Such LINK commands can involve calls from one program in one region (e.g., 536) to another program in another CICS region, including regions (e.g., 538, 540) within the same LPAR 532 or regions (e.g., 542, 544, 546) of another LPAR (e.g., 534) or mainframe device (e.g., 510).

Agents 548, 550, 552, 556, 558, 560 can collect transaction data and communicate the transaction data to an LPAR agent, or LPAR agent manager (e.g., 554, 562) corresponding to the agent's respective LPAR (e.g., 532, 534). The agent manager 554, 562 can, in some implementations, serve as a clearinghouse for all transaction data collected by agents (e.g., 548, 550, 552, 556, 558, 560) on their respective LPAR (e.g., 532, 534) that is to be communicated to virtualization engine 205 for use by the virtualization engine 205 in generating virtual services from the transaction data. In some implementations, virtualization engine 205 can be implemented on computing devices remote from mainframes 505, 510. In such instances, transaction data collected by agents 548, 550, 552, 556, 558, 560 can be routed through respective agent managers 554, 562 for transmission using a central socket (e.g., 555, 565) of the agent manager to one or more computing systems hosting the virtualization engine 205. While in other embodiments, each agent 548, 550, 552, 556, 558, 560 can include its own socket (and agent managers 554, 562 can be omitted), such implementations may be problematic in systems utilizing an aggressive firewall or other network security policies and protections. For instance, security policies of a particular mainframe may make it difficult for multiple different sockets to be opened, each pointed toward virtualization engine 205, without raising an alert or otherwise complicating administration of the overall mainframe system, among potentially other issues.

Multiple clients 515, 520, 525, 530 can have access to and consume services of a virtualization engine 205. Each client (e.g., 515, 520, 525, 530) can initiate recording of various transactions involving various programs on regions of various CICS mainframes. Indeed, such recordings can be carried out concurrently, and transaction data generated during the recordings of such transactions can be communicated over sockets 555, 565 to virtualization engine 205 for processing. Further, clients 515, 520, 525, 530 can also be used to deploy virtual services generated through virtualization engine 205. For instance, various clients (e.g., 515, 520, 525, 530) can each request that a respective virtual service be instantiated in a virtual service engine for use by the CICS programs. For instance, different CICS users can use the clients to perform varying tasks (e.g., testing, development, trainings, etc.) utilizing different virtual services simulating different programs (including programs of mainframes 505, 510) all provided through virtualization engine 205, among other examples.

Figure 6A:
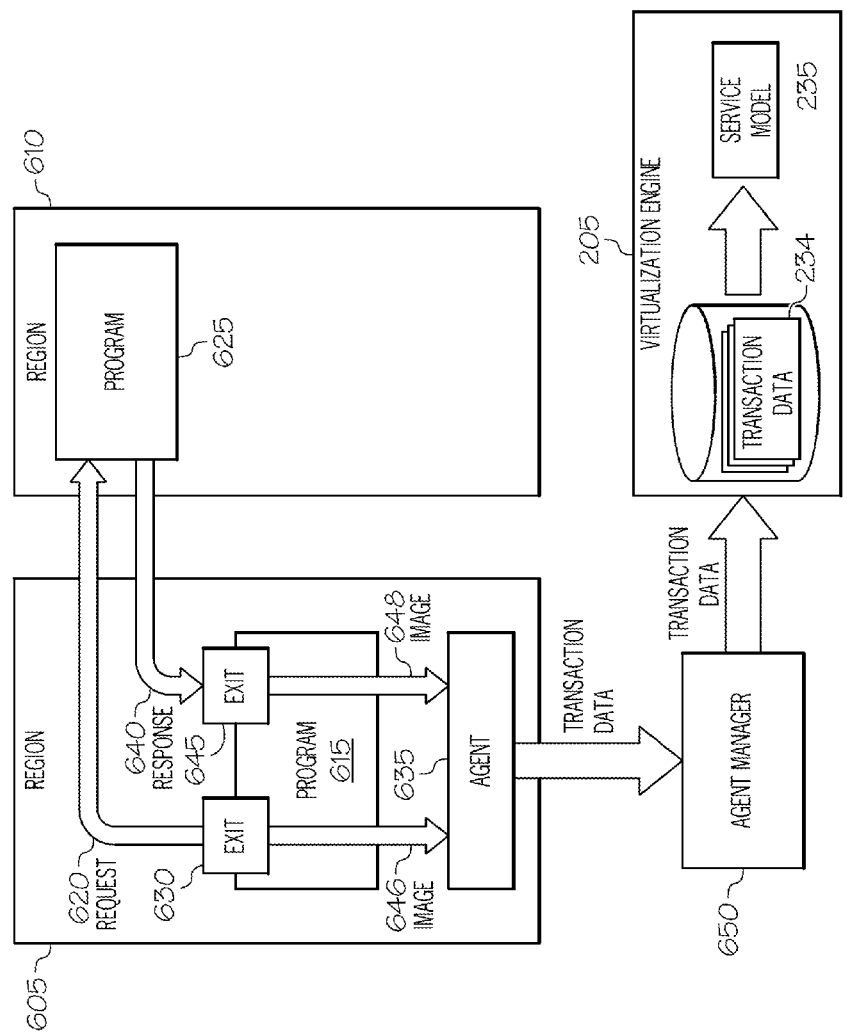
FIGS. 6A-6B are simplified block diagrams illustrating example actions involving virtualization of a software component in accordance with at least some embodiments.
Figure 6B:
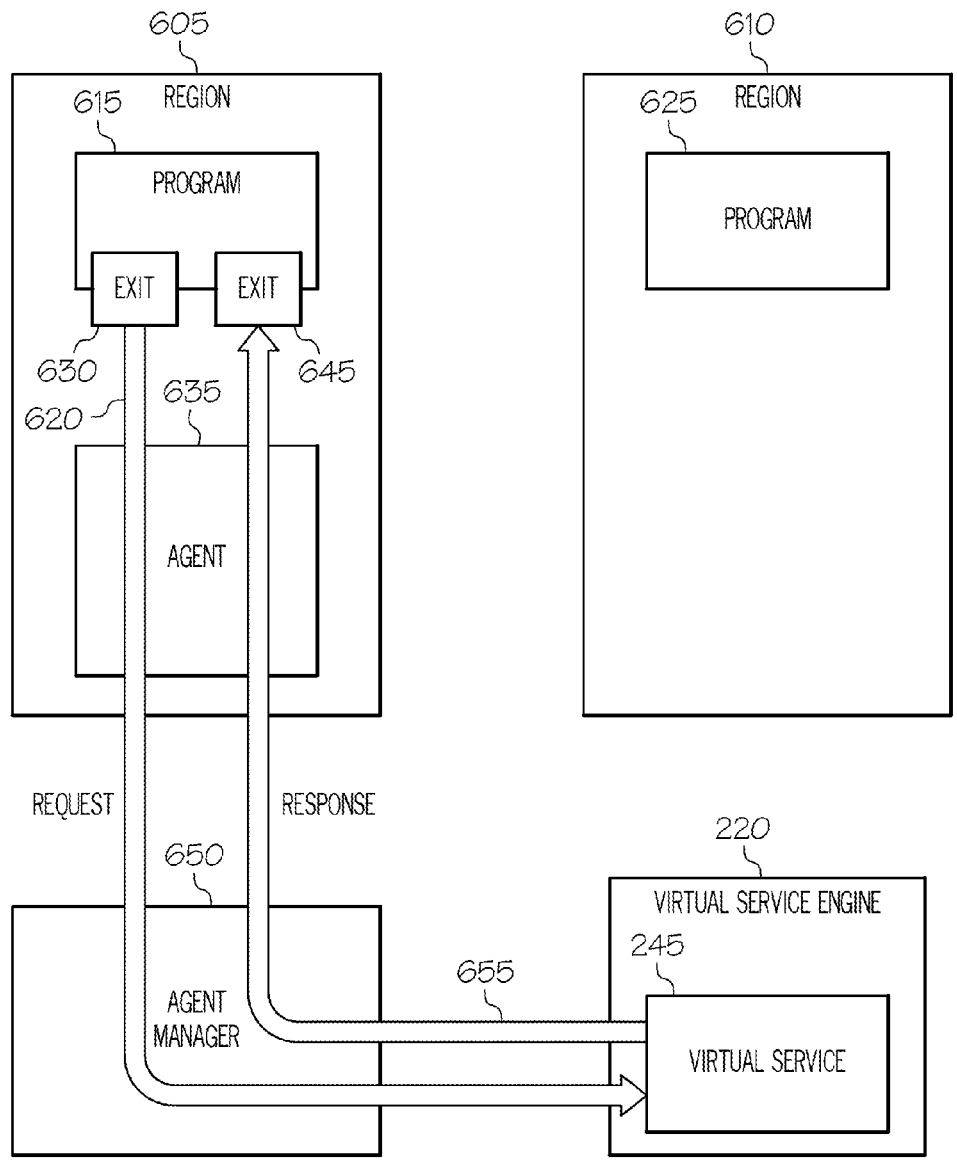

Turning to FIGS. 6A-6B, simplified block diagrams are shown illustrating example techniques included in the virtualization of an example mainframe program. For instance, in FIG. 6A, two regions 605, 610 of one or two mainframes are shown. The first region 605 includes a program 615 that makes a call to another second program 625 on the second region 610. In some implementations, transactions between the first program 615 and second program 625 can be monitored to automatically generate a service model 235 that can be used to instantiate a virtual model to simulate the operation of the second program 625. For instance, in the particular example of FIG. 6A, a call from program 615 to program 625 can invoke an exit 630 to transfer control to a communication or function call command (e.g., CICS LINK, CICS XCTL, and others) that will facilitate the call of the second program 625. Included in the call can be a request 620 including an operation and one or more attributes, as well as potentially additional or other characteristics. The exit 630 can be configured to capture an image (e.g., 646) of the call including the request 620. Data describing the image can be communicated or otherwise made available to agent 635. The request 620 can proceed to the second program 625 through the function control command. The second program 625 can, in turn, process the request 620 and generate a response 640. In some implementations, the second program 625 can make calls of its own to still other programs (not shown) in connection with the generation of the response 640. The response 640 can be returned to the first program 615 through an exit 645. The exit 645 can also be configured to capture an image (e.g., 648) of the response communication that can be communicated to the agent 635.

Exits 630, 645 can be configured to operate in multiple different modes. Agent 635, in some implementations, can be configured to pass or otherwise communicate an instruction for use by the exits 630, 645 to indicate the mode the exits 630, 645 are to operate in within a particular transaction or set of transaction. For instance, exits 630, 645 can operate in any one of a recording mode, playback mode, and pass-through mode. In the case of a recording mode, exits 630, 645 can operate as illustrated in FIG. 6A, allowing function calls, requests, and responses to proceed while monitoring and recording characteristics of the requests and responses and reporting this information to an agent (e.g., 635). The agent 635, in the particular example of FIG. 6A, can obtain or generate transaction data from the images (e.g., 646, 648) recorded by the exits and communicate this transaction data to agent manager 650 to be forwarded to a virtualization engine 205. In other instances, the transaction data can include the image data itself. The virtualization engine 205 can utilize the transaction data (e.g., stored as transaction data 234) to generate a service model 235 from which a virtual service can be instantiated.

When exits 630, 645 operate in playback mode, the exits 630, 645 can function to allow the first program 615 to operate with a virtual service simulating operation of the second program 625. For instance, turning to FIG. 6B, a virtual service 245 is instantiated in a virtual environment of virtual service engine 220 from a service model documenting one or a plurality of transactions (requests and responses) observed between programs 615 and 625 (e.g., according to the techniques shown and described in connection with FIG. 6A). In one example, a user can request virtualization of the second program 625 using virtual service 245 in response to determining that program 625 is unavailable or otherwise constrained. The user request can cause the agent 635 to set exits 630, 645 in playback mode. Program 615 can function as before and make a function call to program 625. However, with exit 630 in playback mode, exit 630 can capture an image of the request 620 included in the call and communicate the request 630 to agent 635. The agent 635 can forward the request through agent manager 650 to the virtual service 245 rather than program 625. The exit 630 can accomplish this, for instance, by invoking a bypass of the function call. Such bypass functionality can be a standard operation capable of being performed by a base version of an exit, such as the CICS XPCREQ exit, among other potential example exits that provide an option to bypass a command for security, load balancing, system maintenance, or other reasons. This bypass functionality can be leveraged in a specialized exit adopting some or all of the functionality of these base versions of an exit but further adapted to operate with an agent 635, virtualization engine, virtual service engine, etc. For instance, the bypass can cause the request to be held and not delivered to the second program 625 so as to allow the request to be redirected for servicing by a virtual service modeling the second program, among other examples.

Upon being passed data identifying the request 620 and its respective operation, attributes, parameters, and other characteristics, virtual service 245 can operate to intelligently mimic the functionality of the second program 625 including simulating performance characteristics of the program, among other features captured from transaction data resulting from the monitoring of transactions involving program 625. The virtual service 245 can further generate a simulated response 655 (e.g., applying at least some of the features described elsewhere herein) that can be passed to agent manager 650. Agent manager 650 can identify the agent (e.g., 635) to which the response 655 applies (e.g., the agent from whom the corresponding request 620 was received) and pass the response to the agent 635. Further, exit 645, operating in playback mode, can identify the response 655 through agent 635 and provide the response 655 to the first program 615 as if the response 655 had actually been provided by the second program 625. In other words, the first program 615 can be completely ignorant of the use of virtual service 245 in the place of second program 625. Indeed, first program 615 can accept the response 655 and continue operation, in some cases, further operating upon the data included in the response 655, among other examples.

In addition to operating in recording and playback mode, exits 630, 645 can additionally operate in other modes including a pass-through mode. In pass-through mode, for instance, exits 630, 645 can effectively turn off their specialized functionality and function as traditional exits for use with a function call (e.g., as typical XPCREQ and XPCREQC exits). In pass-through mode, exits 630 can be used to pass control to a LINK command, for instance, allowing requests and responses to be passed between programs 615, 625 without recording of the transactions or reporting the transactions to the agent 635, among other examples.

Figure 7:
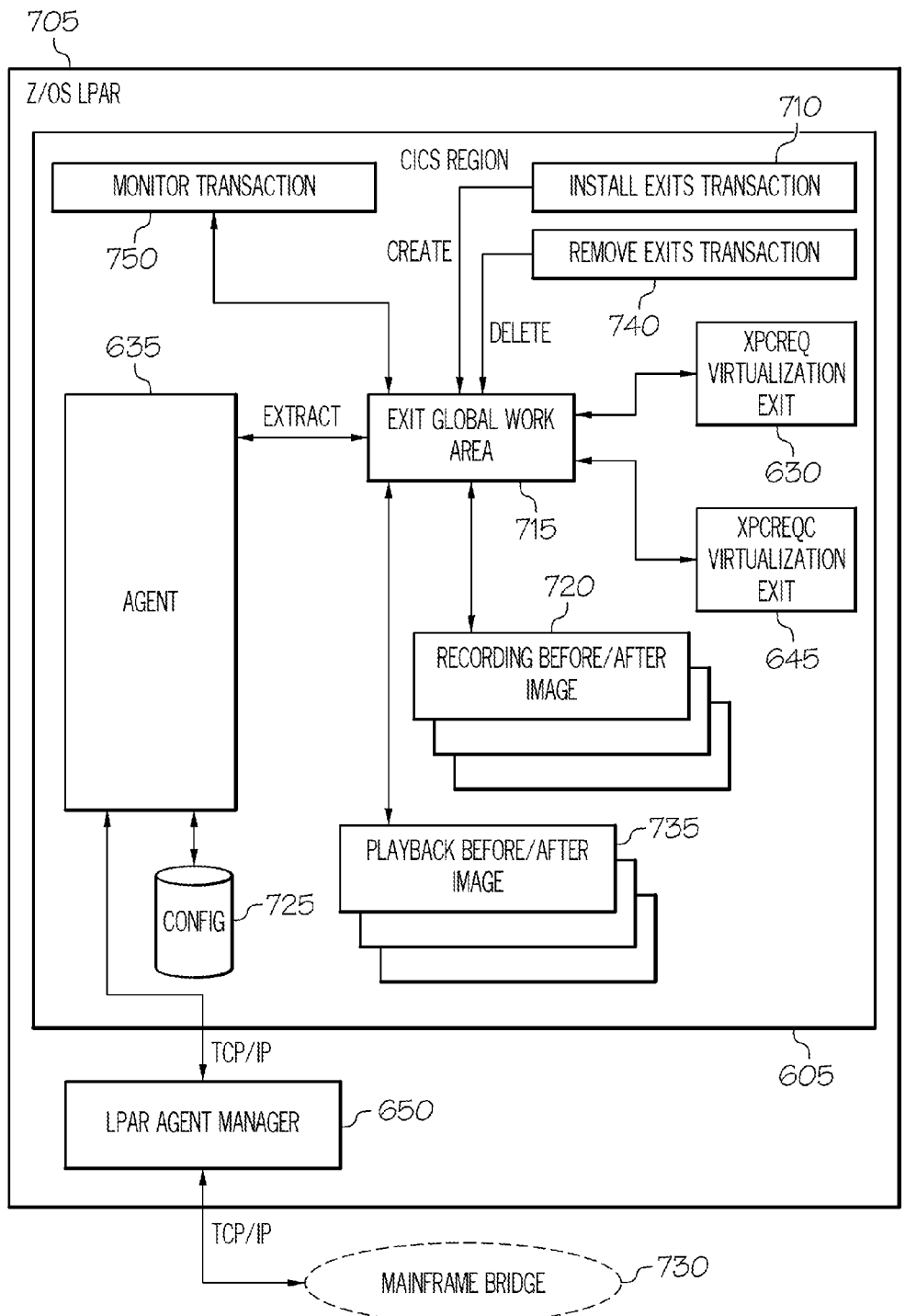
FIG. 7 is a simplified block diagram illustrating an example implementation of an agent in a CICS region in accordance with at least one embodiment.

Turning to FIG. 7, a simplified block diagram is shown of an example implementation of an agent and mainframe in a CICS mainframe. While the example of FIG. 7 is specific to CICS, it should be appreciated that principles of this example, as well as others can be applied to other, non-CICS implementations. In the particular example of FIG. 7, a CICS region (e.g., 605) can be provided in a z/OS LPAR 705. Agent 635 can be a CICS LINK agent and each CICS region (e.g., 605) can include an agent (e.g., 635). Further, LPAR 705 can include an LPAR agent, or agent manager 650, that can receive transaction data collected at multiple different CICS regions by respective CICS LINK agents. In the example of FIG. 7, specialized exits (e.g., 630, 645) can be installed in the region 605. In some cases, specialized exits 630, 645 can exist in addition to instances of a XPCREQ and XPCREQC exit included in the programs of region 605. XPCREQ virtualization exit 630 and XPCREQC virtualization exit 645 can be provide functionality (such as described in the examples of FIGS. 6A-6B) for capturing information concerning request and responses communicated in connection with a CICS EXEC LINK command in a corresponding program. Initialization of the exits 630, 645 and agent 635 can be started during CICS startup program list table (PLT) processing, in some instances. In other instances, agent 635 and exits 630, 645 can be installed and initialized by manually invoking the install exits transaction 710, among other examples.

In addition to installing specialized exits 630, 645, installation transaction 710 can act to install an agent 635 on the region together with an exit global work area (or "work area") 715. The work area 715 can function as a mailbox in which messages and other data can be passed between exits 630, 645 and agent 635. For instance, specialized exits 630, 645 can capture requests and responses between two programs as images (e.g., 720). Such images 720 can be recorded and grouped together by transaction simplifying the association of a request with its response (e.g., for inclusion in a corresponding service model). Further, exits 630, 645 can operate to pass an image it records and continue with the transaction being monitored while the agent 635 asynchronously obtains and processes the information included in the image. Indeed, in some instances, images captured by a single pair of LINK exits (e.g., 630, 645) can be queued in work area 715. The agent 635 can monitor progress of a transaction through data deposited in work area 715 and wait for a response image to be returned by an exit (e.g., 645) that corresponds to an earlier-captured request image returned by exit 630. The agent 635 can then access the images 720 in the work area 715, process the images 720, and pass corresponding transaction data describing the images' request(s) and response(s) to LPAR agent manager 650. In some implementations, agent 635 can utilize configuration information 725 to identify the LPAR agent manager 650 and also assist the LPAR agent manager 650 in identifying the agent 635 as responsible for the monitoring and virtualization of this transaction. The LPAR agent manager 730 can communicate the received transaction data over TCP/IP to a mainframe bridge 730 facilitating communication of the transaction data to a virtualization engine (e.g., 205).

Specialized exits 630, 645 can also be used to facilitate communication and interoperation between a program and one or more virtual services generated from transaction data obtained through the specialized exits 630, 645 resulting from the monitoring of observed transactions involving the program and a second program virtualized using the virtual service(s). A playback image 735 can be captured by exit 630 when in playback mode and the playback image 735 can be made available through work area 715. The agent 635 can obtain the playback image 735 describing the request and communicate the request to the virtual service through LPAR agent manager 650 and mainframe bridge 730. The instantiated virtual service can receive the request and generate a response based on the request. Further, the response of the virtual service can be transmitted through mainframe bridge 730 to LPAR agent manager 650 for forwarding on to agent 635. The agent 635 can pass the virtual service's response or construct an image describing the response and make the response available to the exit 645 through work area 715. The exit 645 can access the virtual service's response and provide the response to the requesting program to simulate the response of the software component modeled by the virtual service.

In some installations and embodiments, features can be included to assist CICS administrators in monitoring the health of their system and the effect of the specialized exits 630, 645, work area 715, agent 635, etc. on the overall operation and health of the system (e.g., 705). For instance, an example monitor transaction 750 can be provided that allows an administrator to view aspects of the work area 715 and agent's 635 operation. For instance, the administrator, using monitor transaction 750, can view the status of the agent 635 and exits 630, 645, the work area 715, recording and playback counts, start and stop agent 635 and exits 630, 645, and check the respective depths of queue such as a recording queue of recorded images (e.g., 720), a playback queue of playback images (e.g., 735) to be sent to the LPAR agent manager 650, and an LPAR agent manager queue of playback images (e.g., 735) waiting for a response from the LPAR agent manager (e.g., as received from a virtual service), among other information and functionality.

An administrator can seamlessly remove specialized exits 630, 645, work area 715, agent 635, etc. from a program and region, for instance, through a simple remove exits transaction 740, among other implementations. For instance, an administrator can conclude, for example, through information obtained from monitor transaction 750, that it is no longer appropriate to utilize the specialized exits and related functionality. Further, in response, the administrator can cause a remove exits transaction 740 to be performed to restore the program to its original form prior to the installation of the specialized exits (e.g., through install exits transaction 710).

Figure 8A:
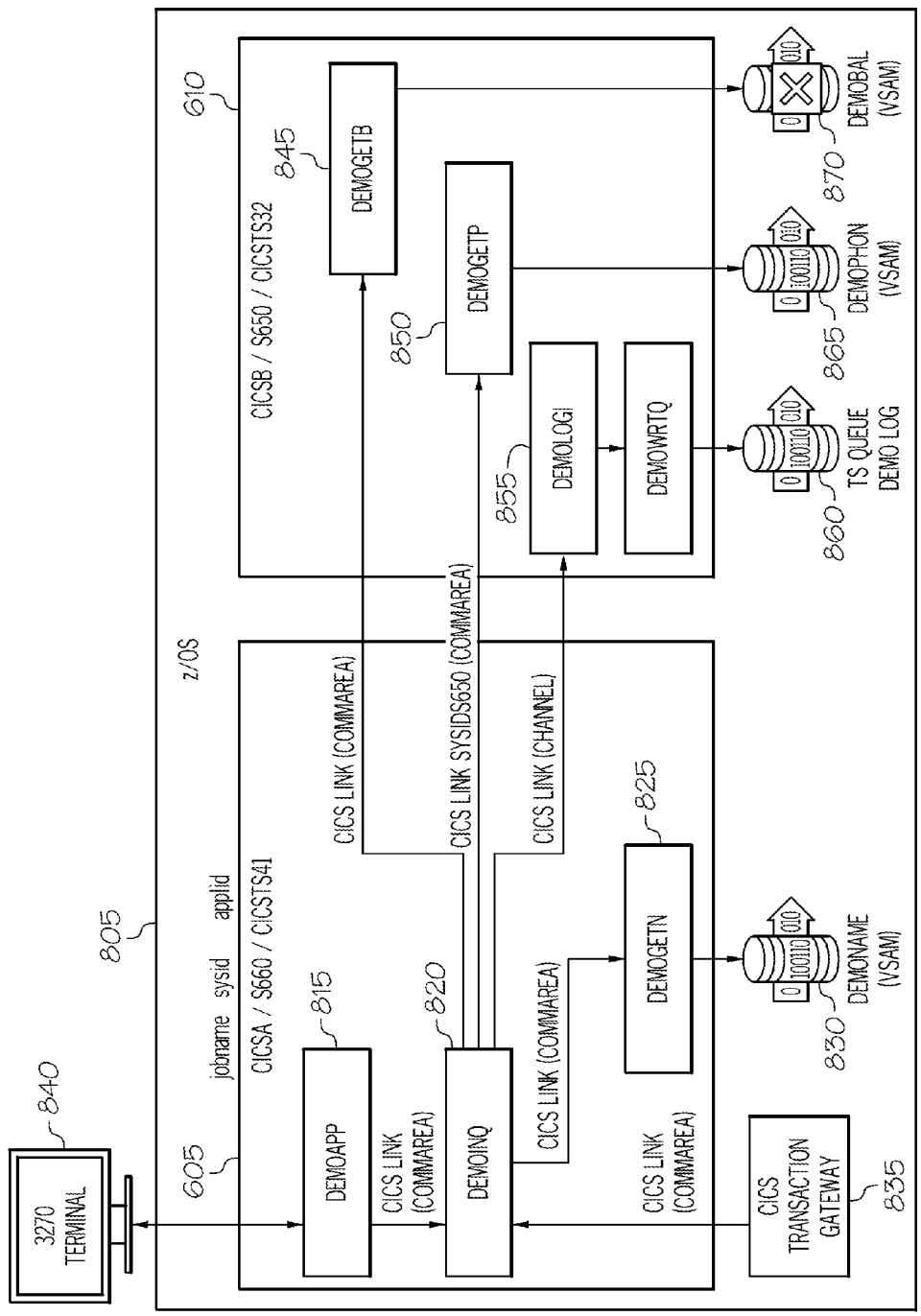
FIGS. 8A-8B are simplified block diagrams illustrating example actions involving virtualization of a CICS software component in accordance with at least one embodiment.
Figure 8B:
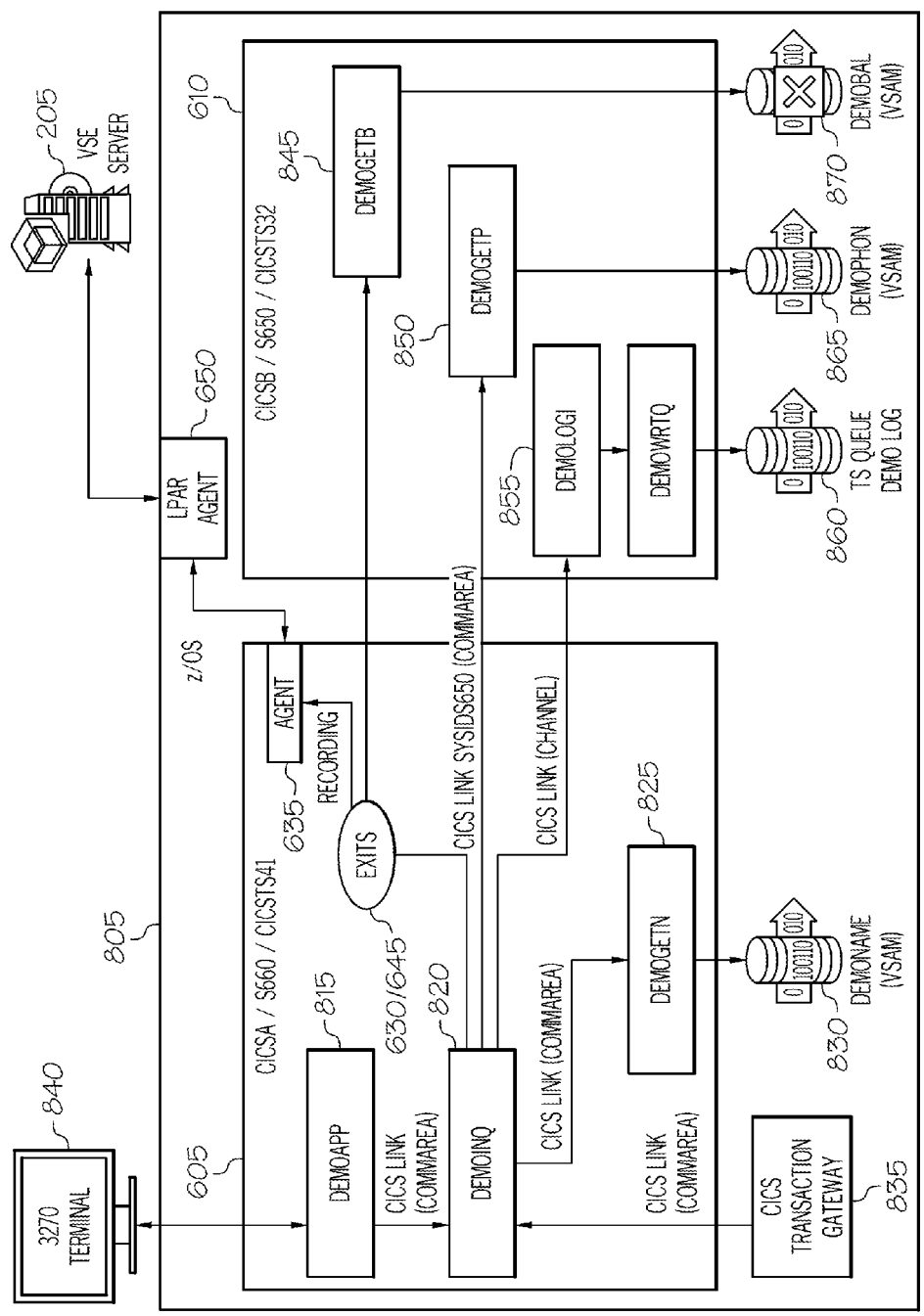

Turning to FIGS. 8A-8B, simplified block diagrams are shown illustrating a more specific example of the virtualization of a particular program or software component (e.g., 845) in a CICS environment. In many respects, the examples of FIGS. 8A-8B build upon at least some of the principles illustrated in the preceding examples of FIGS. 6A, 6B, and 7. In the particular example of FIG. 8A, an LPAR 805 implementing z/OS includes at least two CICS regions (e.g., 605, 610). A first region 605 can include one or more software components, such as programs, applications, scripts, or other software-based modules, including software components 815, 820, 825. Software component DEMOINQ 820 can interact with software component 815 and CICS transaction gateway 835 among potentially other software components and resources. DEMOINQ 820 can further interact with and send requests to other software components (e.g., 825) within the same region 605 using a CICS LINK command. Some software components (e.g., 825) of region 605 can interface with databases (e.g., virtual storage access method (VSAM) store 830), while others (e.g., 815) can provide one or more user interfaces (e.g., at user terminal 840) as a front end to the tasks to be performed using programs of the region and CICS mainframe.

In addition to interfacing with other software components in the same region, example software component DEMOINQ (820) can additionally include calls to and interactions with software components of other regions. For instance, DEMOINQ 820 can call, using CICS LINK commands, any one of software components 845, 850, 855, etc. of a second region 610, including software components interfacing with other data stores (e.g., 860, 865, 870). Using specialized exits and coordinating CICS LINK agents, in one implementation, transactions between the DEMOINQ software component 820 and anyone of software components 845, 850, 855 can be monitored and resulting transaction data describing requests and responses between the software components can be used to generate virtual services for any one or all of the software components 845, 850, 855 with which software component 820 interacts using a LINK command.

In one particular example, access to a data store 870 may be known to be constrained. This can also constrain access to the full functionality of software component DEMOGETB 845 that relies on data store 870. Accordingly, in one example, a user may initiate recording of transactions between the DEMOINQ software component 820 and the DEMOGETB software component 845 (e.g., when data store DEMOBAL 870 is online) in order to collect transaction data that can be used to virtualize the functionality of the DEMOGETB software component 845 (including its use of the data store 870).

Turning to FIG. 8B, specialized exits 630, 645 can be provided in connection with the LINK call from DEMOINQ 820 to DEMOGETB 845. Similar exits can be provided in connection with each of the LINK commands included in any one of software components 815, 825, 845, 850, 855, etc., allowing monitoring (and thereby virtualization) of transactions involving the software components. In recording mode, exits 630, 645 can record transactions between DEMOINQ 820 and DEMOGETB 845 including the requests sent from DEMOINQ 820 to DEMOGETB 845 and the responses sent from DEMOGETB 845 to DEMOINQ 820, among other information. Multiple different transactions involving varying operations and attributes can be monitored between DEMOINQ 820 and DEMOGETB 845 utilizing exits 630, 645 and agent 635. Information describing these requests and responses can be communicated to the agent 635 for forwarding on to LPAR agent manager 650 for communication and use by a virtual service system including a virtualization engine (e.g., 205). A virtual service can then be generated to simulate and stand-in for software component DEMOGETB 845, allowing software component DEMOINQ 820 to be tested or otherwise used when data store 870 or software component DEMOGETB 845 are unavailable. Indeed, in examples where virtual services have been generated and are available for each of software components 845, 850, 855, each of these respective virtual services can be instantiated to allow software component 820 to simulate any of its respective calls to programs within region 610, among other examples.

Figure 9A:
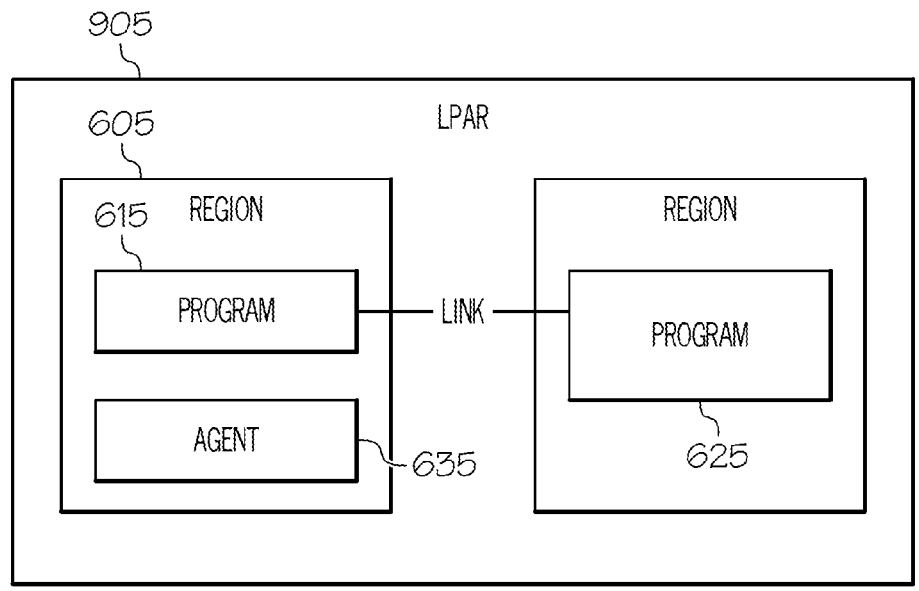
FIGS. 9A-9B are simplified block diagrams illustrating an example virtualization of a program in accordance with at least some embodiments.
Figure 9B:
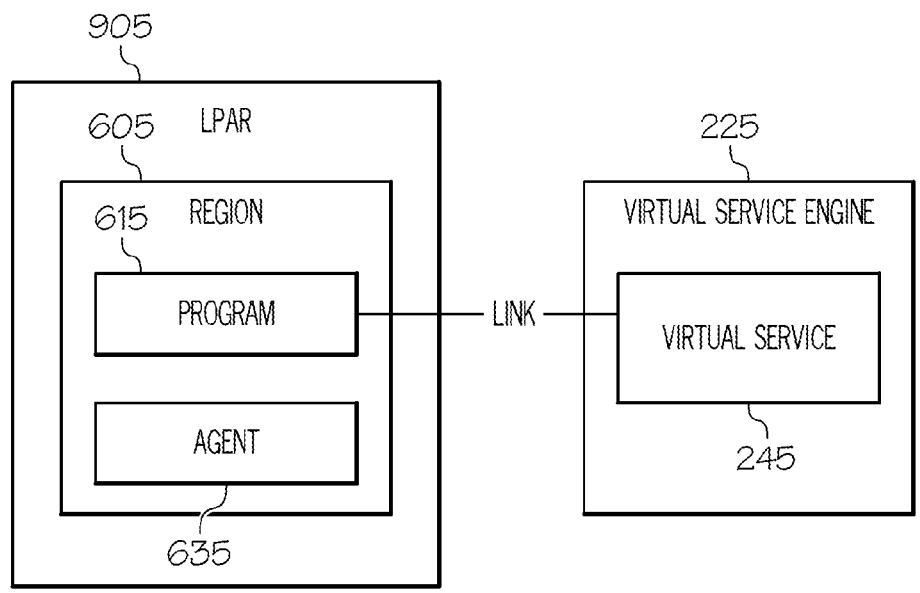

Virtual services can be used to virtualize various portions of a system. The examples of FIGS. 9A-9B include simplified block diagrams illustrating an example virtualization of a program in another region, similar to the examples of FIGS. 8A-8B. In FIG. 9A, a program 615 can be designed to make a function call to a program 625. Transactions can be completed between the programs 615, 625 that can be monitored by exits used in connection with the function call and at least one agent (e.g., 635). As shown in FIG. 9B, monitored transactions can be used to virtualize the program 625 using a virtual service engine 220 running virtual service 245. Indeed, in some instances, this can allow tests of program 615 involving transactions with program 625 even when program 625 (or region 610) is unavailable.

Figure 10A:
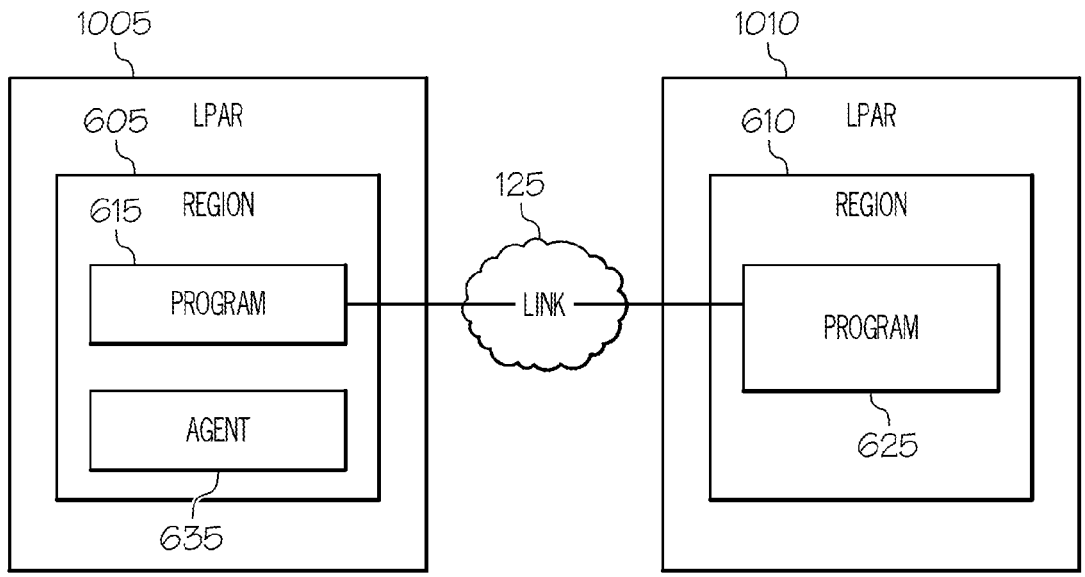
FIGS. 10A-10B are simplified block diagrams illustrating an example virtualization of a program in accordance with at least some embodiments.
Figure 10B:
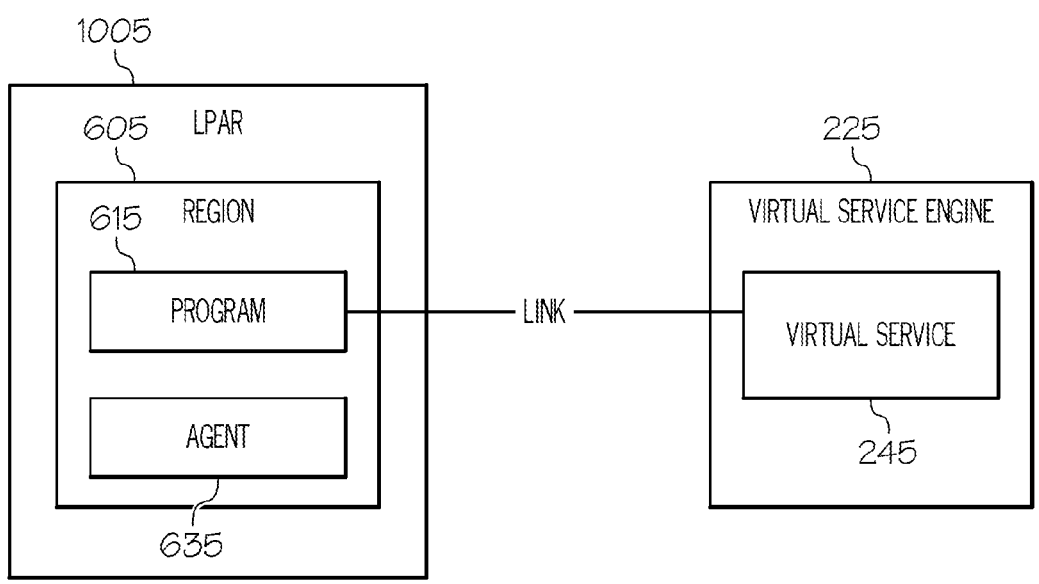

Turning to FIGS. 10A-10B, virtualization can also allow virtualization of responding or server software components hosted on separate computing devices, LPARs, and the like. For instance, in the example of FIG. 10A, a program 615 in a region 605 of a first LPAR 1005 can call another program 625 hosted in a region 610 of a different LPAR 1010, for instance, using one or more networks (e.g., 125). As in other examples described herein, transactions between the software components 615 and 625 can be monitored (e.g., using agent 635 and specialized exits in program 615) to generate a virtual service (e.g., 245) simulating the program 625, as shown in FIG. 10B. This can allow testing and other tasks to be performed using program 615 even in the unavailability of LPAR 1010, region 610, program 625, network 125, etc.

Figure 11A:
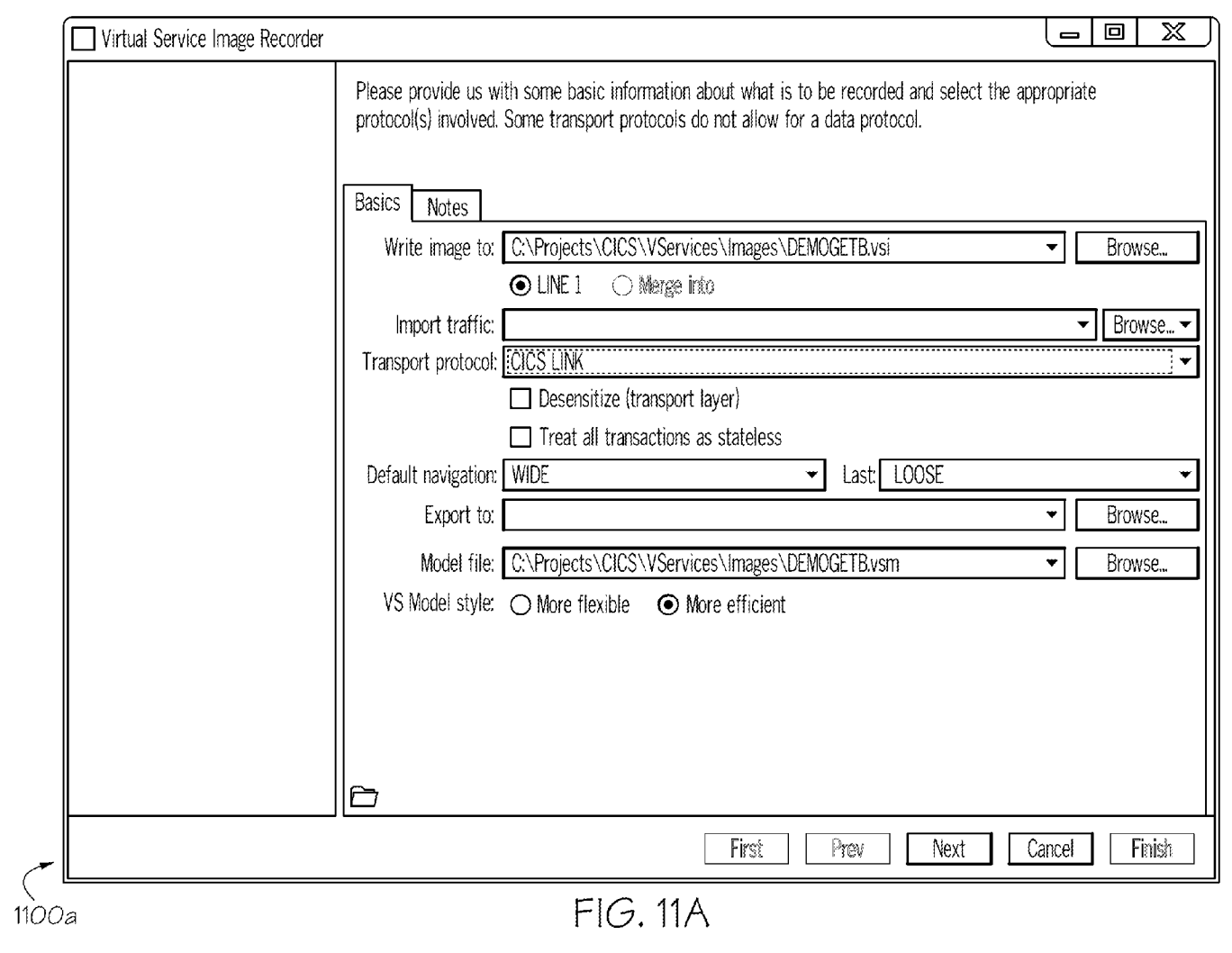
Figure 11B:
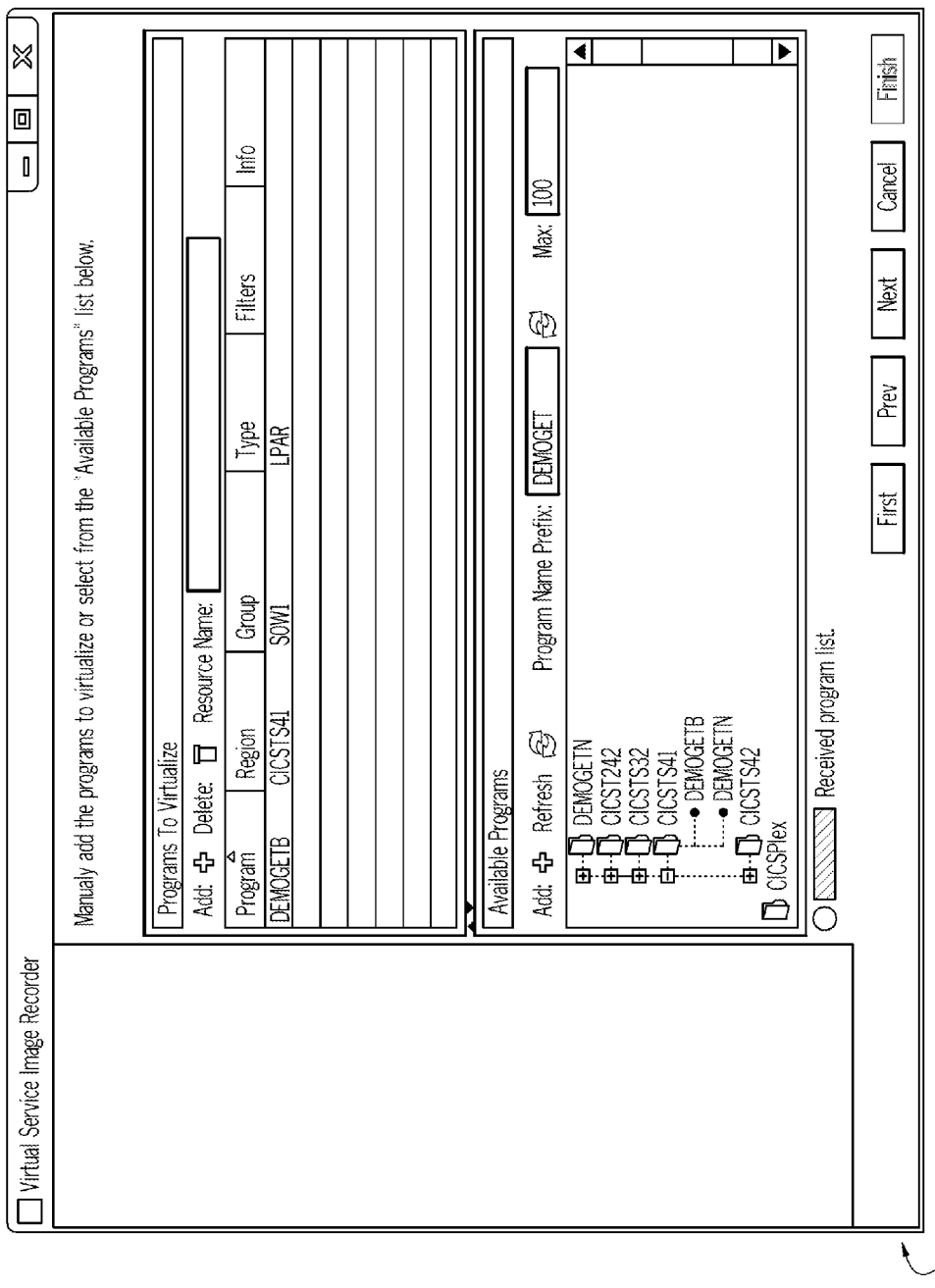
Figure 11C:
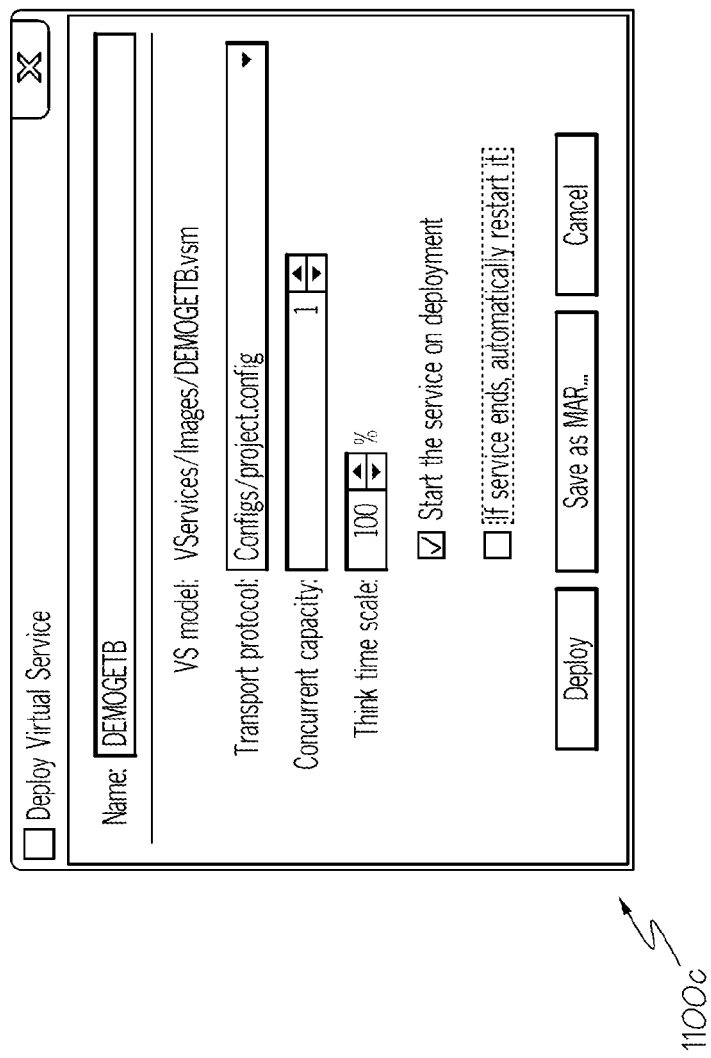

Turning to FIGS. 11A-11C, example screenshots 1100a-c are shown illustrating additional features of at least some implementations of the concepts and systems above. For instance, in the example of FIG. 11A, a screenshot 1100a is shown of a graphical user interface (GUI) of an example virtualization engine that can be presented to a user through a display of a user device, such as a touchscreen, monitor, or other device. The GUI of screenshot 1100a can be used, for instance, by a user to initiate recording of a particular software component that the user desires to virtualize through one or more virtual services. The user can select a particular software component, for instance, from a directory of files, and specify a location to save a service model of the particular software component. Further, the user can specify aspects of the service model to be generated from transaction data resulting from the recording. For instance, the user can specify the type of monitoring or service model, for instance, according to the transport protocol utilized in requests to the particular software component. For instance, a user can select such protocols as CICS LINK, Hypertext Transfer Protocol, Java Methods, Java Message Service (JMS), Transport Control/Internet Protocol (TCP/IP) messages, Java Database Connectivity (JDBC) database calls, Distributed Relational Database Access (DRDA) database calls, among others.

FIG. 11B shows a screenshot 1100*b* of another example GUI that can be presented to a user to assist the user in initiating generation of a virtual service through the recording of transactions involving a particular software component to be modeled by the virtual service. For instance, a search field can be presented to a user allowing the user to filter a directory of available software components that can be selected. The directory can be presented to a user allowing the selection of one or more software components that are to be monitored. Recording transactions of a software component can result in the creation of a new service model and virtual service from the transaction data resulting from the recording. Recording of transactions can also supplement data of an existing service model to improve or otherwise modify an existing virtual service among other examples.

Turning to the example of FIG. 11C, a screenshot 1100*c* of another GUI is shown. The example GUI of FIG. 11C can allow a user to select an existing virtual service that can be deployed to simulate operation of a particular software component (or system of software components). The user can also specify various performance parameters to be adopted by the virtual service during its deployment, such as timing and delay characteristics, among other examples. Further, in some implementations, a user can select to deploy a virtual service in connection with a test, training session, or other session, among other examples.

Figure 12:
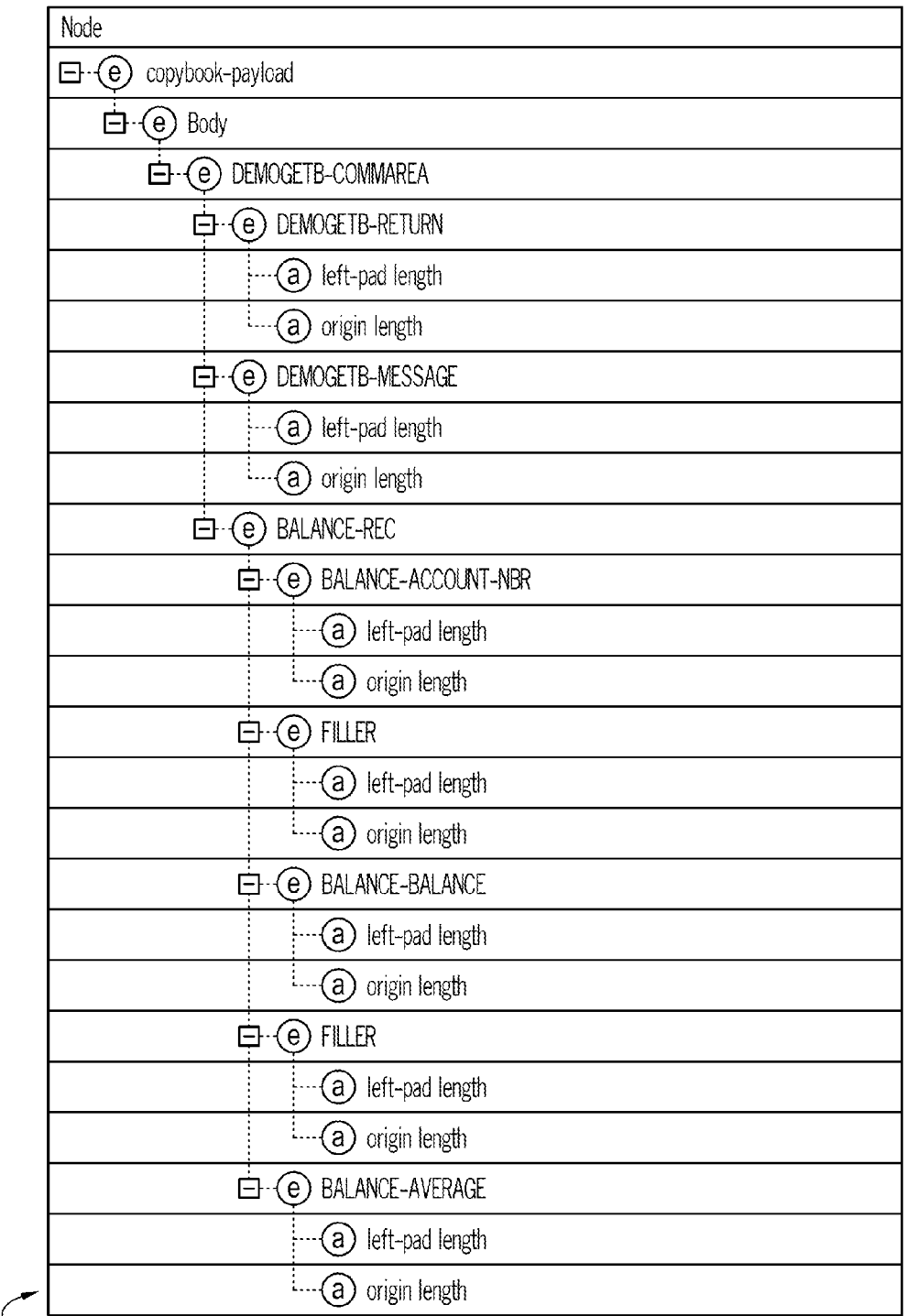
FIG. 12 represents an example image captured by an agent in an example CICS system in accordance with at least one embodiment.

Turning now to FIG. 12, an example view of an image captured by a specialized exit in a mainframe program is shown. For instance, in a CICS environment data can be passed by a requesting program to a responding program in a CICS COMMAREA. The format and layout of the COMMAREA data can be embodied in a copybook member and the image captured by a specialized exit can be an image conforming to the format of the copybook. The image can be passed to an agent or to the virtualization engine to be processed. An image can be processed by parsing the associated copybook to identify its structure, as represented in the hierarchical diagram of FIG. 12. Indeed, in some implementations, a GUI can be presented that includes a graphical representation of a parsed copybook image. Further, parsing of the copybook can allow for the identification of a request and/or response, any operations included in the request, attributes included in the request and/or response, and so on.

Figures 13A, 13B:
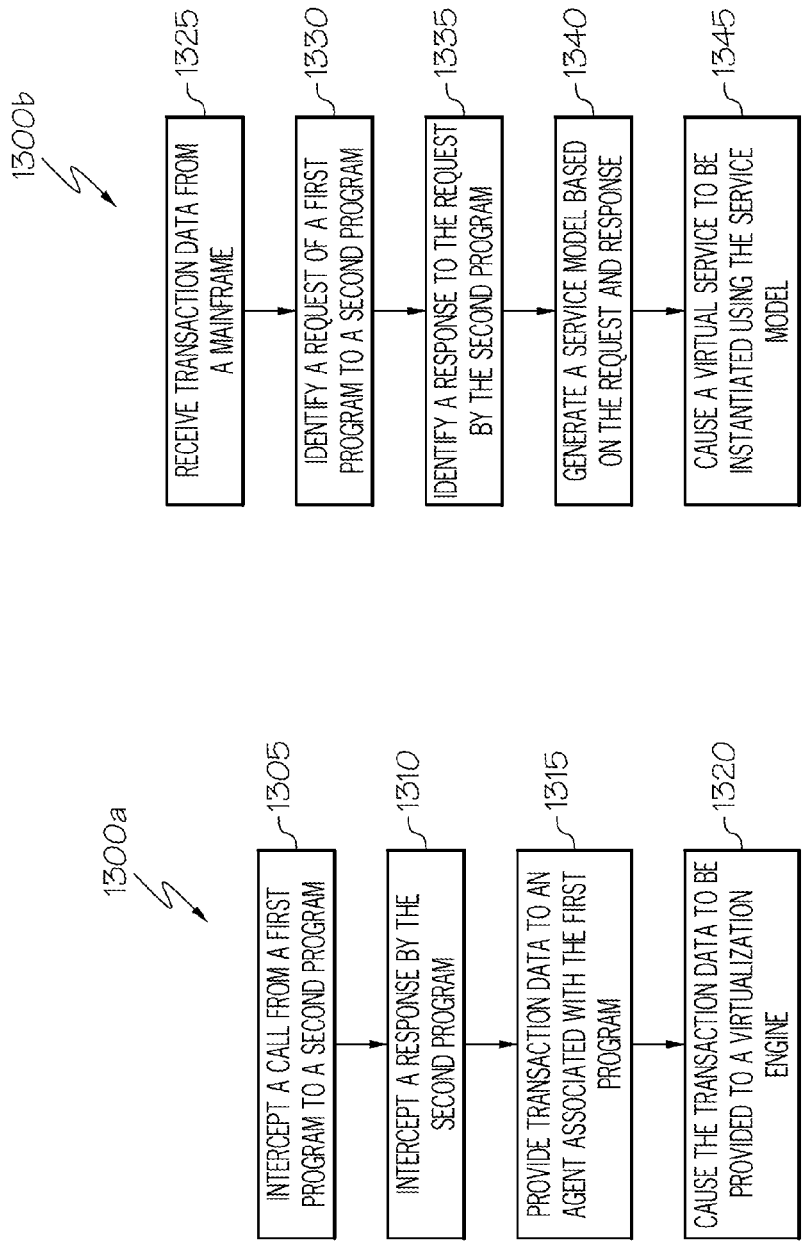
FIGS. 13A-13D are simplified flowcharts illustrating example techniques in connection with virtualization of a software component in accordance with at least one embodiment.

FIG. 13A is a simplified flowchart 1300*a* illustrating an example technique for intercepting requests and responses involving a particular program for use in generating a virtual service of the particular program. For instance, a call by a first program to a second program, such as a LINK command, can be intercepted 1305, for instance, using an exit of the first program, such as a modified XPCREQ exit. The request can be allowed to proceed to the second program and the second program can generate a response to the request. The response can be intercepted 1310 by an exit of the first program, such as a modified XPCREQC exit. Data describing the intercepted request and response can be provided 1315 to an agent associated with the first program (such as an agent installed in the region or LPAR in which the first program resides). The data can in turn be communicated to or otherwise provided 1320 to a virtualization engine configured to use transaction data describing requests to and responses of the second program to generate a virtual service executable to simulate operation of the second program. The virtual service, in some implementations, can be based on a corresponding service model describing characteristics of the various responses generated by the second program to various requests received by the second program from the first program (and potentially other programs) and, in some cases, observed by agents or specialized exits recording the request and responses within a CICS environment, among other examples.

FIG. 13B is a simplified flowchart 1300*b* illustrating an example technique for virtualizing a particular program. For instance, transaction data can be received 1325 from a mainframe, such as transaction data based on requests and responses between a first program and second program intercepted by an exit of the first program, among other examples. One or more requests by the first program can be identified 1330 from the transaction data along with one or more responses (e.g., at 1335) by the second program to the requests. The transaction data can be forwarded to a virtualization engine, for instance, from an agent capable of accessing request and response images captured by the exits, among other examples. A service model can be generated 1340 based on the identified requests and responses and a virtual service can be instantiated 1345 (e.g., by the virtualization engine, on a virtual service engine, etc.) based on the service model. The virtual service can be configured to simulate the operations of the second program, in particular, simulating responses of the second program to various requests received by the second program as well as performance characteristics of the second program, among other examples.

Figures 13C, 13D:
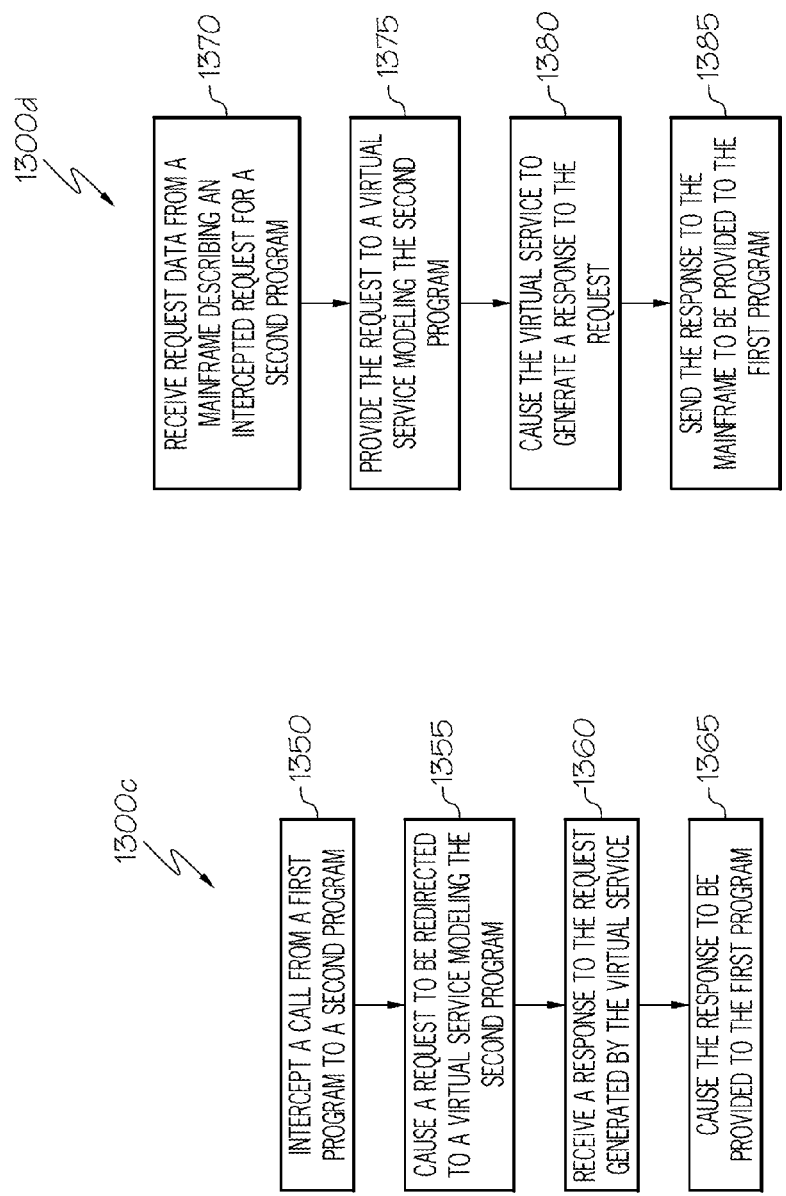

Turning to the example of FIG. 13C, a call can be intercepted from a first program to a second program. The intercepted call can include a request and can be intercepted 1350 using a specialized exit included in the first program and associated with the call (e.g., a modified XPCREQ exit preceding a CICS LINK command). The intercepted request can be communicated or otherwise provided, for instance, to an agent operating in conjunction with the specialized exit and facilitating redirection 1355 of the request to a virtual service configured to simulate operation of the second program. After the request has been redirected 1355 to the virtual service, a response can be received 1360 to the request that was generated by the virtual service. The response can be provided 1365 to the first program, for instance, by a specialized exit associated with the call (e.g., a modified XPCREQC exit following the CICS LINK command). The first program can consider the response to be from the second program although the response was, in fact, generated by the virtual service modeling the second program.

In the example of FIG. 13D, request data can be received 1370 from a mainframe that describes an intercepted request by a first program to a second program. The request can be intercepted in connection with a call of the second program by an exit of the first program associated with the call (e.g., a modified XPCREQ exit preceding a CICS LINK command). The request described in the request data can be provided 1375 to a virtual service configured to model the second program. The virtual service can be caused to execute and process the request to generate 1380 a simulated response of the second program to the request. The simulated response can be sent 1385 to the mainframe, for instance, to an agent or agent manager, on the mainframe, allowing the response to be provided to the first program (e.g., through a modified XPCREQC exit following the CICS LINK command) as a response to the request of the first program.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   intercepting, using a data processing apparatus, a call by a first program to a second program using a first exit of the first program associated with the call, wherein the call comprises a request of the second program;
   facilitating redirection of the request to a virtual service configured to model operation of the second program;
   receiving a response to the call generated by the virtual service; and
   returning the response to the first program using a second exit of the first program associated with the call.

2. The method of claim 1, wherein the first program is in a first logical partition (LPAR).

3. The method of claim 2, wherein the first program is in a first region of the first LPAR and the second program is in a second region of the first LPAR.

4. The method of claim 2, wherein the second program is in a second LPAR.

5. The method of claim 2, wherein the request is redirected through an agent manager of the first LPAR.

6. The method of claim 5, wherein data describing the request is provided to an agent associated with the first program and the agent communicates the request to the agent manager.

7. The method of claim 6, wherein the first program is in a first region of the first LPAR and agent comprises an agent for the first region.

8. The method of claim 6, wherein the agent provides the request to the second exit.

9. The method of claim 1, wherein the call comprises a Customer Information Control System (CICS) LINK command.

10. The method of claim 9, wherein the first exit comprises an XPCREQ exit configured to record data describing the request, provide the recorded data for communication to the virtual service, and to bypass the call to the second program during modeling of the second program by the virtual service.

11. The method of claim 10, wherein the second exit comprises an XPCREQC exit to provide the response to the first program as a modeled response of the second program.

12. The method of claim 1, wherein the first exit is distinct from the second exit.

13. The method of claim 1, wherein the call is intercepted at a particular instance and the method further comprises:
   intercepting, at another instance prior to the particular instance, another call by the first program to the second program, wherein the other call is intercepted by the first exit and comprises the request;
   intercepting a response by the second program to the request using the second exit; and
   causing transaction data describing the request and response to be sent to a virtualization engine for use in generation of the virtual service.

14. A method comprising:
   identifying request data describing a request by a first program to a second program, wherein the request data is based on an interception, by a first exit in the first program, of a call to the second program by the first program, wherein the call comprises the request;
   identifying response data describing a response by the second program to the request, wherein the response data is based on an interception of the response by a second exit in the first program; and
   instantiating, using a data processing apparatus, a virtual service based on the request data and response data, wherein the virtual service, when executed, is to model operation of the second program.

15. The method of claim 14, further comprising receiving image data captured at least in part by the first exit, wherein the request data is to be identified from the received image data.

16. The method of claim 15, wherein the image data is further captured by the second exit and the response data is to be identified from the received image data.

17. The method of claim 15, wherein the image data is received from an agent associated with the first program.

18. The method of claim 17, wherein the first program is in an LPAR and the agent comprises an agent manager of the LPAR.

19. The method of claim 14, further comprising generating a service model from the request data and response data, wherein the virtual service is to be instantiated based on the service model.

20. A computer program product comprising a non-transitory computer readable storage medium comprising computer readable program code embodied therewith, the computer readable program code comprising:
   computer readable program code configured to intercept a call by a first program to a second program using a first exit of the first program associated with the call, wherein the call comprises a request of the second program;

computer readable program code configured to facilitate redirection of the request to a virtual service configured to model operation of the second program;

computer readable program code configured to receive a response to the call generated by the virtual service; and computer readable program code configured to return the response to the first program using a second exit of the first program associated with the call.

21. A computer program product comprising a non-transitory computer readable storage medium comprising computer readable program code embodied therewith, the computer readable program code comprising:

computer readable program code configured to identify request data describing a request by a first program to a second program, wherein the request data is based on an interception, by a first exit in the first program, of a call to the second program by the first program, wherein the call comprises the request;

computer readable program code configured to identify response data describing a response by the second program to the request, wherein the response data is based on an interception of the response by a second exit in the first program; and computer readable program code configured to instantiate a virtual service based on the request data and response data, wherein the virtual service, when executed, is to model operation of the second program.

22. A system comprising:

a processor device;

a memory element; and a virtual service manager to:

identify request data describing a request by a first program to a second program, wherein the request data is based on an interception, by a first exit in the first program, of a call to the second program by the first program, wherein the call comprises the request;

identify response data describing a response by the second program to the request, wherein the response data is based on an interception of the response by a second exit in the first program; and instantiate a virtual service based on the request data and response data, wherein the virtual service, when executed, is to model operation of the second program.

23. The system of claim 22, wherein the virtual service manager is further to:

receive redirected request data describing a request from the first program intended for the second program, wherein the redirected request data is based on an interception, by the first exit of a call to the second program;

cause the virtual service to generate a modeled response to the request; and cause the modeled response to be returned to the first program using the second exit.

24. The system of claim 23, wherein the redirected request data is received over a socket corresponding to an agent manager associated with the first program.

25. The system of claim 24, wherein the first program is in a particular LPAR and the agent manager comprises an agent manager of the particular LPAR.

* * * * *